(12) United States Patent
Zhang et al.

(10) Patent No.: US 9,103,901 B2
(45) Date of Patent: Aug. 11, 2015

(54) POSITION DETERMINATION METHODOLOGY SELECTION

(75) Inventors: Gengsheng Zhang, Santa Clara, CA (US); Kelly G. Johnson, Saratoga, CA (US); Shanta P. Namburi, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 641 days.

(21) Appl. No.: 13/406,440

(22) Filed: Feb. 27, 2012

(65) Prior Publication Data

US 2012/0302257 A1 Nov. 29, 2012

Related U.S. Application Data

(60) Provisional application No. 61/447,544, filed on May 26, 2011.

(51) Int. Cl.
*H04W 68/00* (2009.01)
*G01S 5/02* (2010.01)
*H04W 64/00* (2009.01)

(52) U.S. Cl.
CPC .............. *G01S 5/0263* (2013.01); *H04W 64/00* (2013.01)

(58) Field of Classification Search
CPC .............................. G01S 5/0263; H04W 64/00
USPC ........ 455/420, 436, 456.1, 456.2, 456.3, 457, 455/550.1, 556.2
See application file for complete search history.

(56) References Cited

U.S. PATENT DOCUMENTS

| | | | | |
|---|---|---|---|---|
| 6,389,291 | B1 * | 5/2002 | Pande et al. | 455/456.5 |
| 6,757,545 | B2 * | 6/2004 | Nowak et al. | 455/456.2 |
| 2002/0019698 | A1 * | 2/2002 | Vilppula et al. | 701/207 |
| 2006/0052115 | A1 * | 3/2006 | Khushu | 455/456.3 |
| 2006/0074556 | A1 | 4/2006 | Hoiness et al. | |
| 2008/0194273 | A1 | 8/2008 | Kansal et al. | |
| 2009/0191897 | A1 | 7/2009 | Johnson et al. | |
| 2010/0289659 | A1 | 11/2010 | Verbil | |
| 2011/0090115 | A1 | 4/2011 | Gum et al. | |

FOREIGN PATENT DOCUMENTS

WO   WO02076118 A1   9/2002

OTHER PUBLICATIONS

International Search Report and Written Opinion—PCT/US2012/027016—ISA/EPO—Jun. 25, 2012.
Partial International Search Report—PCT/US2012/027016—ISA/EPO—May 4, 2012.

* cited by examiner

*Primary Examiner* — Babar Sarwar
(74) *Attorney, Agent, or Firm* — Berkeley Law & Technology Group, LLP

(57) ABSTRACT

Various methods, apparatuses and articles of manufacture are provided for use in or with a mobile device to identify one or more attributes for each of a plurality of positioning resources available at the mobile device. In an example, positioning resources may provide all or part of a position fix based, at least in part, on one or more wireless signals received by the mobile device, and/or one or more electrical signals received from one or more sensors onboard the mobile device. For example, in certain instances at least one of the positioning resources may have at least one attribute that is different than at least one other attribute of anther positioning resource. In certain examples, at least one of the positioning resources may be selected for obtaining a position fix based, at least in part, on a request and one or more particular attributes.

46 Claims, 7 Drawing Sheets

POSITION DETERMINATION METHODOLOGY SELECTION

CLAIM OF PRIORITY UNDER 35 U.S.C. §119

This application claims priority under 35 USC 119 to U.S. Provisional Application Ser. No. 61/447,544, filed May 26, 2011, and entitled, "POSITION DETERMINATION METHODOLOGY SELECTION", which is assigned to the assignee hereof and which is incorporated herein by reference.

BACKGROUND

1. Field

The subject matter disclosed herein relates to electronic devices, and more particularly to methods, apparatuses and articles of manufacture for use in or by a mobile device to make selective use of one or more available on-board positioning resources, some of which may employ different position determination methodologies.

2. Information

Mobile devices, such as PDAs, cell phones, smart phones and/or the like typically include functionality to provide location based services. For example, mobile devices may host applications for performing navigation functions or other functions that use position estimates of the mobile device obtained in real time. In particular example implementations, a mobile device may implement several different technologies for obtaining location estimates in real time. For example, a mobile device may include one or more receivers capable of acquiring signals from terrestrial based or satellite based transmitters to obtain information for use in computing a location estimate or "position fix." Such technologies may include, for example, obtaining position fixes from a satellite position system such as the Global Positioning System (GPS) or other global navigation satellite system (GNSS), measuring ranges to terrestrial based cellular base stations using advanced forward trilateration (AFLT), measuring the signal strength (RSSI) received from WLAN Access Points (APs) and/or round-trip time (RTT) between the mobile and APs just to name a few examples. In other implementations, a mobile device may obtain a location estimate or position fix using multiple different technologies in a so-called hybrid positioning system.

It should be understood that different positioning technologies as pointed out above have different capabilities and limitations, etc. For example, some technologies will enable a quicker "time to fix" than others. Similarly, some technologies will provide a more precise location estimate than others. Also, certain technologies may have different power consumption characteristics and therefore consume different amounts of stored battery life. Also, depending on a particular operating environment, certain technologies may not be available while others may be available.

SUMMARY

In accordance with certain aspects, a method may be provided for use in a mobile device to: identify one or more attributes for each of a plurality of positioning resources available at the mobile device, wherein each of the plurality of positioning resources provides a position fix of the mobile device based, at least in part, on at least one of: one or more wireless signals received by the mobile device, or one or more signal received from one or more sensors onboard the mobile device, and wherein at least one of the plurality of positioning resources has at least one of the one or more attributes that is different than at least one other of the plurality of positioning resources; obtain a request for a position fix of the mobile device; and select at least one of the positioning resources for obtaining a position fix based, at least in part, on the request and the one or more attributes.

In accordance with certain other aspects, an apparatus may be provided use in a mobile device. The apparatus may comprise: means for identifying one or more attributes for each of a plurality of positioning resources available at the mobile device, wherein each of the plurality of positioning resources provides a position fix of the mobile device based, at least in part, on at least one of: one or more wireless signals received by the mobile device, or one or more signal received from one or more sensors onboard the mobile device, and wherein at least one of the plurality of positioning resources has at least one of the one or more attributes that is different than at least one other of the plurality of positioning resources; means for obtaining a request for a position fix of the mobile device; and means for selecting at least one of the positioning resources for obtaining a position fix based, at least in part, on the request and the one or more attributes.

In accordance with yet another aspect, a mobile device may be provided which comprises: one or more receivers; one or more sensors; and one or more processing units to: identify one or more attributes for each of a plurality of positioning resources available at the mobile device, wherein each of the plurality of positioning resources provides a position fix of the mobile device based, at least in part, on at least one of: one or more wireless signals received via the one or more receivers, or one or more electrical signals received from the one or more sensors, and wherein at least one of the plurality of positioning resources has at least one of the one or more attributes that is different than at least one other of the plurality of positioning resources; obtain a request for a position fix of the mobile device; and select at least one of the positioning resources for obtaining a position fix based, at least in part, on the request and the one or more attributes.

In accordance with still another aspect, in article of manufacture may be provided for use in/with a mobile device. The article of manufacture may comprise: a non-transitory computer readable medium having stored therein computer implementable instructions that are executable by one or more processing units to: identify one or more attributes for each of a plurality of positioning resources available at the mobile device, wherein each of the plurality of positioning resources provides a position fix of the mobile device based, at least in part, on at least one of: one or more wireless signals received by the mobile device, or one or more signal received from one or more sensors onboard the mobile device, and wherein at least one of the plurality of positioning resources has at least one of the one or more attributes that is different than at least one other of the plurality of positioning resources; obtain a request for a position fix of the mobile device; and select at least one of the positioning resources for obtaining a position fix based, at least in part, on the request and the one or more attributes.

In accordance with another aspect, a method may be provided which may be performed by a computing platform of a mobile device. The method may comprise: identifying a plurality of positioning resources available and their current attributes for servicing requests for position fixes from a plurality applications hosted on the mobile device; and scheduling one of the positioning resources to service a new request for a position fix from one of the applications concurrently with a process to serve a previous position fix request from one or more other of the applications.

In accordance with still another aspect, the apparatus may be provided for use in a mobile device, the apparatus may comprise: means for identifying a plurality of positioning resources available and their current attributes for servicing requests for position fixes from a plurality applications hosted on the mobile device; and means for scheduling one of the positioning resources to service a new request for a position fix from one of the applications concurrently with a process to serve a previous position fix request from one or more other of the applications.

In accordance with another aspect, a mobile device may be provided which comprises: a plurality of positioning resources; and one or more processing units to: identify a plurality of positioning resources available and their current attributes for servicing requests for position fixes from a plurality applications hosted on the mobile device; and schedule one of the positioning resources to service a new request for a position fix from one of the applications concurrently with a process to serve a previous position fix request from one or more other of the applications.

In accordance with still another aspect, in article of manufacture may be provided for use in/with a mobile device. The article of manufacture may comprise: a non-transitory computer readable medium having computer implementable instructions stored therein that are executable by one or more processing units of the mobile device to: identify a plurality of positioning resources available and their current attributes for servicing requests for position fixes from a plurality applications hosted on the mobile device; and schedule one of the positioning resources to service a new request for a position fix from one of the applications concurrently with a process to serve a previous position fix request from one or more other of the applications.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
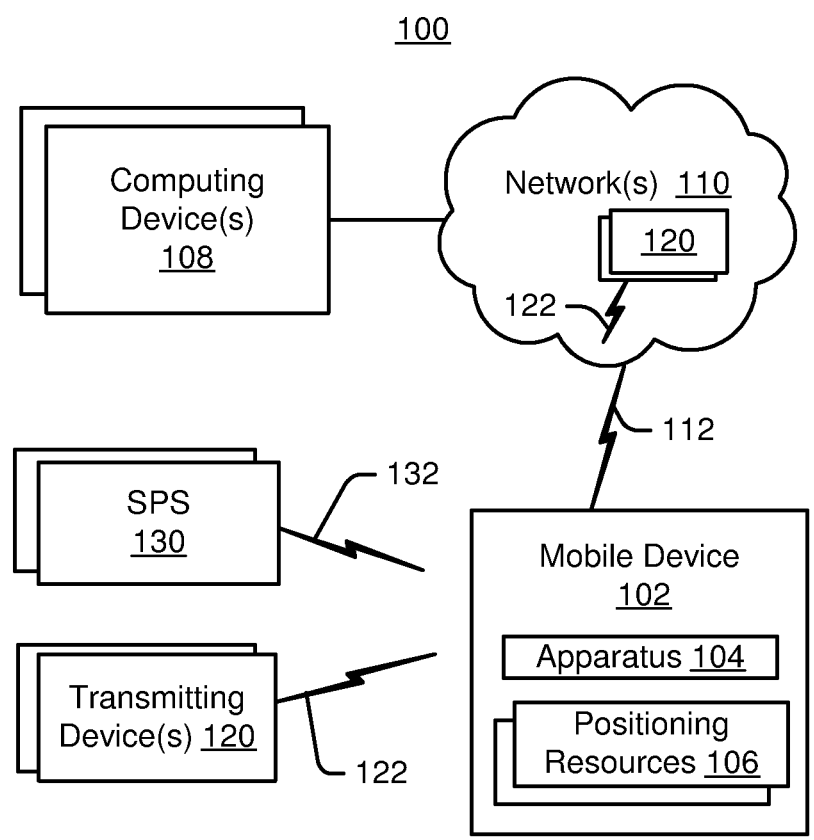
FIG. 1 is a schematic block diagram illustrating an environment in which a mobile device may make selective use of one or more available on-board positioning resources, some of which may employ different position determination methodologies and in which one or more computers may be provisioned to provide assistance data, compute fixes, etc., in accordance with an example implementation.

As pointed out above, mobile devices typically have capabilities to obtain location estimates and/or position fixes (referred to herein after simply as a position fix or position fixes) in support of one or more applications or functions (which may be referred to interchangeably herein). Also, as discussed above, different technologies available for obtaining position fixes on a mobile device typically vary in their ability to provide accuracy in location estimates, ability to obtain a position timely fashion (e.g., "time-to-fix"), propensity to consume power, and availability. Here, embodiments described herein are directed to, among other things, managing resources available for obtaining location estimates or position fixes in support of applications based, at least in part, on particular attributes of the different position determination technologies available for use.

Several techniques are described herein by way of example and which may be implemented using various methods, apparatuses, and/or articles of manufacture for use in or by a mobile device to make selective use of one or more available on-board positioning resources (e.g., various subsystems provided within a mobile device), some of which may employ different position determination methodologies.

By way of an initial example, a mobile device may be enabled to identify one or more attributes for each of a plurality of positioning resources which may be available at the mobile device. Here, for example, the plurality of positioning resources may be used to assist in determining a position fix of the mobile device, e.g., based, at least in part, on one or more wireless signals received by the mobile device, one or more on-board sensors (e.g., inertial, environmental, etc.). Since some of the positioning resources may utilize different position determining methodologies, e.g. some may work with different wireless signals, certain sensors, etc., it may be beneficial to select one or more specific positioning resources at a given time to assist in determining a position fix the mobile device. Accordingly, one or more of the positioning resources may have one or more attributes that is different in some way.

By way of example, one or more attributes may correspond to an operational state of the mobile device. For example, attribute may correspond to a particular operational state of the mobile device by indicating whether or not a particular positioning resource may or may not provide an adequate position fix (e.g., with a desired accuracy, within a desired first time to fix, with a particular desired format, etc.) as may be desired/required by the particular operational state. For example, a mobile device may have "emergency" operational state in which a position fix with a particular accuracy, time to fix, format, and/or the like or some combination thereof may be desired.

In certain example implementations, one or more attributes may correspond to at least one position fix criteria. For example, a position fix criteria may characterize, at least in part, an expected power consumption, an expected achievable time to fix, an expected achievable position accuracy, an expected position availability, an expected position format, and/or the like or some combination thereof with regard to a positioning resource.

In certain example implementations, a position fix criteria may characterize one or more policies that may be considered in selecting a positioning resource. For example, a position fix criteria may characterize a use policy, a security policy, a preference policy, and/or the like or some combination thereof with regard to the mobile device, a requesting application or function, a user of the mobile device, a positioning resource, a wireless signal transmitting device, and/or the like or some combination thereof.

A mobile device may, for example, obtain a request for a position fix of the mobile device. For example, a request may be obtained from one or more applications and/or functions enabled, at least in part, via the mobile device. In certain example implementations, a request for a position fix may be indicative of one or more desired characteristics for the position fix. For example, one or more desired characteristics for a position fix may correspond directly or indirectly to one or more attributes that have been identified for positioning resources available at the mobile device. In an example implementation, a desired characteristic for position fix may be indicative of a desired position accuracy, a desired time to fix, a desired position format, etc. In an example implementation desired characteristic for position fix may characterize a requesting application/function in some manner with regard to a use policy, a security policy, a preference policy, etc. Thus, in certain example instances, mobile device may select one or more positioning resources for obtaining position fix(es) based, at least in part, on a comparison of one or more desired characteristics to one or more attributes.

In accordance with certain example implementations, having obtained at least one request for position fix mobile device may select at least one of the positioning resources for obtaining a position fix based, at least in part, on the request and the one or more attributes that have been identified for the various positioning resources available at the mobile device. In certain example instances, a mobile device may consider whether a recently obtained position fix from one or more of the positioning resources satisfies a request for a position fix. For example, a mobile device may consider whether recently obtained position fix may or may not satisfy a request for a position fix based, at least in part, on an age of the recent position fix, accuracy of the recent position fix, the format of the recent position fix, and/or the like or some combination thereof. In certain example instances, a mobile device may further consider one or more signals associated with one or more sensors (e.g., inertial sensors, environmental sensors, light sensor, audio sensor) that may indicate whether the mobile device has or has not been moved significantly since the recent position fix was obtained. In certain example instances, a mobile device may consider one or more policies in determining whether a recent position fix may be used to satisfy a subsequently received request for a position fix. Thus, for example, in certain instances it may be improper (with regard to a particular policy) to provide a position fix having a particular level of accuracy to certain applications/functions. If a mobile device determines that a recently obtained position fix satisfies a subsequently received request for a position fix, then the mobile device may identify the recent position fix in response to a request.

By way of some example implementations, a mobile device may comprise one or more of: an SPS based positioning resource; an AFLT and/or other like based positioning resource; a cell sector (ID) and/or other like based positioning resource; a wireless local area network, wireless wide area network, and/or other like Wi-Fi based positioning resource; a near-field and/or other like wireless communication based positioning resource; an ad hoc wireless network and/or other like based positioning resource, and/or the like or some combination thereof. In certain other example implementations, a mobile device may comprise one or more sensors, such as, one or more inertial sensors (e.g., an accelerometer, a gyroscope, etc.), one or more environmental sensors (e.g., a magnetizer, a compass, a barometer, a thermometer, a light sensor, a sound sensor, etc.).

In accordance with certain example implementations, a mobile device may select position fix from a plurality of position fixes obtained from one or more of the positioning resources. In accordance with certain example implementations, a mobile device may combine or otherwise handle a plurality of requests for positioning fixes from one or more application/functions in selecting a particular obtained position fix and/or in selecting a particular positioning resource to obtain a position fix.

In accordance with certain example implementations, a request may be obtained from and/or a position fix may be provided to an application programming interface capable of serving a plurality of applications or functions that are, at least in part, implemented at the mobile device.

As illustrated by way of certain example implementations herein, one or more processing units may be provided at a mobile device to provide a first manager capability (e.g., hardware or firmware operating in accordance with certain programming instructions) for obtaining a request for a position fix of the mobile device from an application or a function (e.g. directly, indirectly via an application programming interface). For example, in certain instances a unified location manager (ULM) may be provided to act as a first manager capability to obtain a request for a position fix, and/or to provide a position fix and/or information indicative of such a position fix to application/function associated with a request for a position fix. Additionally, in certain example implementations, a second manager capability may be provided that may be responsive to a first manager capability, at least in part, in selecting at least one of the positioning resources for obtaining a position fix. For example, in certain instances one or more location method managers (LMMs) may be provided to act as a second manager capability to select one or more positioning resources for obtaining a position fix in response to a request for position fix. Further, in certain example implementations, a third manager capability may be provided that may be responsive to a second manager capability, at least in part, providing at least one command to at least one of the selected positioning resources. For example, in certain instances one or more subsystem managers (SSMs) may be provided to act as a third manager capability in initiating or otherwise commanding that a selected positioning resource be used to obtain (or at least attempt to obtain) a position fix. In certain example implementations, one or more subsystem controllers (SSCs) may also be provided to operate with the LMMs and/or SSMs. In accordance with certain further example implementations, a first manager capability, a second manager capability, and/or a third manager capability may be provided, at least in part, by a modem processor and/or the like, which may be responsive, at least in part, to at least one request received from an application processor and/or the like.

Attention is now drawn to FIG. 1, which is a schematic block diagram illustrating an environment 100 in which a mobile device 102 using apparatus 104 may make selective use of one or more available positioning resources 106, some of which may employ different position determination methodologies, in accordance with an example implementation.

Mobile device 102 may be representative of any electronic device that may be moved about within environment 100 by direct and/or indirect involvement of a person (a user), and/or whose position location may otherwise change from time to time for some reason. By way of example, mobile device 102 may comprise a computer and/or communications device, such as, e.g. a cellular telephone, a smart phone, a lap top computer, a tablet computer, a peripheral device, a tracking device, and/or the like or some combination thereof. In another example mobile device 102 may comprise one or more electronic devices and/or circuits that may be configured within an indoor otherwise attached in some manner to a machine, a vehicle, and/or the like or some combination thereof.

Apparatus 104 may be representative of one or more processing units, and/or other forms of logic that may be provided via hardware, firmware, and/or some combination thereof, possibly along with some form of software applicable for use by the hardware and/or firmware. Apparatus 104 may, for example, be responsive to a request for a position fix of mobile device 102 in selecting one or more of positioning resources 106 and/or position fixes obtained therefrom, and returning, when possible, a position fix to a requesting application/function.

As illustrated mobile device 102 may communicate over a communication link 112 with one or more computing devices 108, e.g. via one or more networks 110. In this example, communication link 112 is illustrated as representing one or more wireless communication links. However, in other example implementations communication link 112 may comprise one or more wired and/or wireless communication links. In certain example implementations, mobile device 102 may obtain assistance data, etc., from computing device 108.

Computing device(s) 108 may, for example, be representative of all or part of one or more computing platforms and/or all or part of one or more computing resources that may exchange one or more electrical signals representing encoded information and/or instructions with mobile device 102. Thus, for example, one or more computing devices 108 may provide information and/or instructions mobile device 102, and/or receive information and/or instructions from mobile device 102, e.g. via networks 110. In certain example implementations, computing device 108 may generate and/or otherwise provide assistance data, all or part of a position fix, etc., to mobile device 102.

Networks 110 may, for example, be representative of one or more wired and/or wireless communication systems or networks that may be capable of supporting communication between various electronic devices, such as computing devices 108, mobile device 102, etc. Thus, in certain instances network(s) 110 may comprise all or part of a wired and/or wireless telecommunications system, all or part of a wired and/or wireless data communications network, the Internet, an intranet, and/or the like or some combination thereof. As further illustrated, in certain instances network(s) 110 may comprise one or more transmitting devices 120 that may transmit one or more wireless signals 122 that may be used by at least one of the positioning resources 106 in mobile device 102 to obtain a position fix. For example, in certain example implementations, network(s) 110 may comprise one or more transmitting devices 120 in the form of a cellular telecommunications system base station and/or the like, which may transmit AFLT and/or other like pilot signals, or other wireless signals that may be indicative of a cellular sector ID and/or the like, etc. for example, in certain implementations, network(s) 110 may comprise one or more transmitting devices 120 in the form of a data communication network access point and/or the like, which may transmit certain wireless signals to (and/or possibly exchange certain wireless signals with) mobile device 102 in support of a position fix determination by one or more of the positioning resources 106.

As further illustrated, one or more transmitting device(s) 120 may be provided which may not be part of network(s) 110, but which may transmit one or more wireless signals to (and/or possibly exchange one or more wireless signals with) mobile device 102 in support of a position fix determination. By way of example, a location Beacon and/or the like in the form of a wireless signal 122 may be transmitted by a transmitting device(s) 124 and used in supporting a position fix determination by one or more of the positioning resources 106. In certain example implementations, one or more other mobile devices may transmit one or more wireless signals (e.g., WiFi, etc.) that may be used in supporting a position fix determination by one or more of the positioning resources 106.

In accordance with certain example implementations, mobile device 102 may comprise one or more positioning resources 106 that may use one or more SPS signals 132 transmitted by one or more resources in one or more SPS 130. For example, a GNSS may transmit a plurality of SPS signals 132 that may be used in supporting a position fix determination by one or more of the positioning resources 106.

Figure 2:
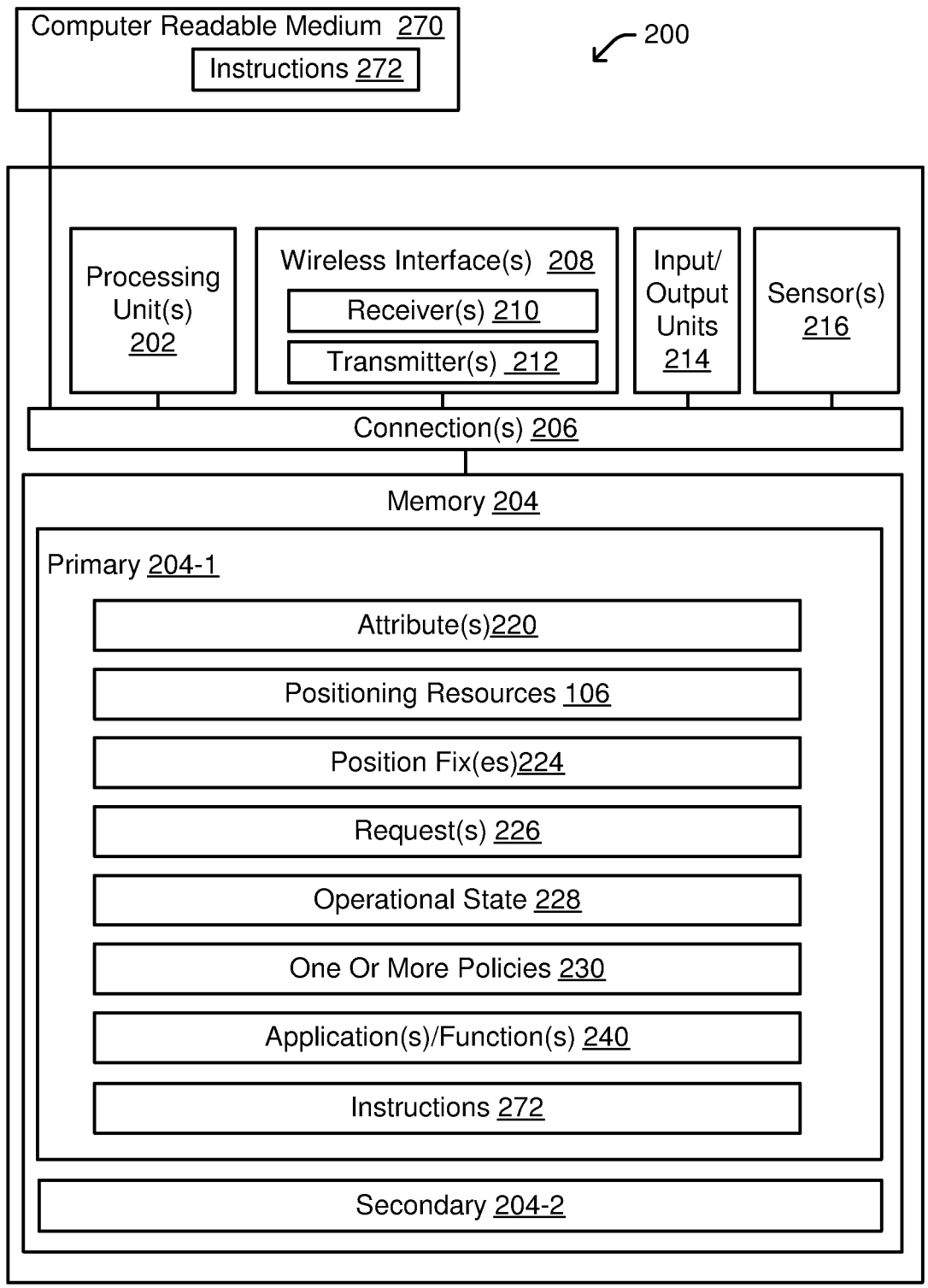
FIG. 2 is a schematic block diagram illustrating certain features of a computing device that may be provided in a form of a mobile device, and which may make selective use of one or more available on-board positioning resources, some of which may employ different position determination methodologies, in accordance with an example implementation.

Attention is drawn next to FIG. 2, which is a schematic block diagram illustrating certain features of a computing device 200 that may be provided in a form of a mobile device 102 and/or apparatus 104, and which may make selective use of one or more available positioning resources 106 (e.g., see FIG. 1), in accordance with an example implementation.

As illustrated, computing platform 200 may comprise one or more processing units 202 to perform data processing (e.g., in accordance with the techniques provided herein) coupled to memory 204 via one or more connections 206. Processing unit(s) 202 may, for example, be implemented in hardware or a combination of hardware and software. Processing unit(s) 202 may, for example, be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within mobile device 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, a (non-transitory) computer readable medium 270. Memory 204 and/or computer readable medium 270 may comprise computer-implementable instructions 272 for certain example techniques as provided herein.

As illustrated in FIG. 2, at various times, memory 204 may store certain signals representing data and/or computer-implementable instructions for certain example techniques as provided herein. For example, memory 204 may store data and/or computer-implementable instructions for apparatus 104 (FIG. 1). By way of example, memory 204 may at various times store data and/or computer implementable instructions indicative of and/or relating to: one or more attributes 220; one or more positioning resources 106; one or more position fixes 224; one or more requests 226 for a position fix; an operational state 228 of the mobile device and/or otherwise relating to a portion thereof; one or more policies 230; one or more applications/functions 240; computer readable instructions 272; and/or the like or some combination thereof.

As shown, computing platform 200 may, for example, comprise one or more wireless interface(s) 208. Wireless interface(s) 208 may, for example, provide a capability to receive and/or transmit wired and/or wireless signals, e.g., to communicate via network(s) 110 (FIG. 1). W wireless interface(s) 208 may, for example, prize one or more receivers 210, one or more transmitters 212, and/or the like or some combination thereof. In certain instances, for example, wireless interface 208 may be comprised of one or more interfaces possibly including but not limited to interfaces for wide area networks (WAN) such as GSM, UMTS, CDMA, LTE, WCDMA and CDMA 2000 and interfaces for personal area networks (PAN) such as WiFi and Bluetooth. It is also understood that there may be multiple wireless interfaces 208 that may be used simultaneously or individually. Wireless interface 208, may in certain implementations also concurrently and/or alternatively act as a receiver device (and/or transceiver device). In certain example implementations, wireless interface 208 may also be representative of one or more wired network interfaces.

In certain other instances, for example, a wireless interface 28 may comprise an SPS receiver, e.g. for use in receiving SPS signals 132 from one or more SPS 130 (FIG. 1). As used herein, SPS 130 may represent one or more GNSS (e.g., GPS, Galileo, GLONASS, etc.), one or more regional navigation satellite systems (RNSS), and/or the like, and which may which may use one or more satellite-based transmitting devices and/or one or more supporting terrestrial-based transmitting devices.

As shown, example computing platform 200 may comprise one or more input/output units 214. For example, input/output units 214 may be representative of one or more user related input and/or user output devices. Thus, for example, input/output units 214 may comprise a keypad, a touch screen, various buttons, various indicators, a display screen, a speaker, a microphone, a projector, a camera, etc.

Computing platform 200 and the form of mobile device 102 may be representative of any electronic device that may be moved about or change position location within environment 100. For example, mobile device 102 may comprise a hand-held computing and/or communication device, such as, a mobile telephone, a smart phone, a lap top computer, a tablet computer, a positioning/navigation device, and/or the like. In certain example implementations all or part of computing platform 200, mobile device 102, and/or apparatus 104 may be part of a circuit board, an electronic chip, etc.

It should be understood that computing platform 200 and/or other like mobile device 102 may also or alternatively comprise one or more other circuits, mechanisms, etc., (not shown) that may be of use in performing one or more other functions or capabilities, and/or supportive of certain example techniques as provided herein.

Computing platform 200, for example in the form of mobile device 102 may be enabled (e.g., via one or more wireless interfaces 208) for use with various wireless communication networks such as a wireless wide area network (WWAN), a wireless local area network (WLAN), a wireless personal area network (WPAN), and so on. The term "network" and "system" may be used interchangeably herein. Further, in the present description the term Wi-Fi with regard to a positioning resource may be used to represent one or more of a variety of wireless communication networks, protocols etc., the wireless signals from which may be used, at least in part, and determining a position fix. A WWAN may, for example, comprise a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may, for example, implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may, for example, include technologies implemented according to IS-95, IS-2000, and IS-856 standards. A TDMA network may, for example, implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may, for example, comprise an IEEE 802.11x network, and a WPAN may, for example, comprise a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

Figure 3:
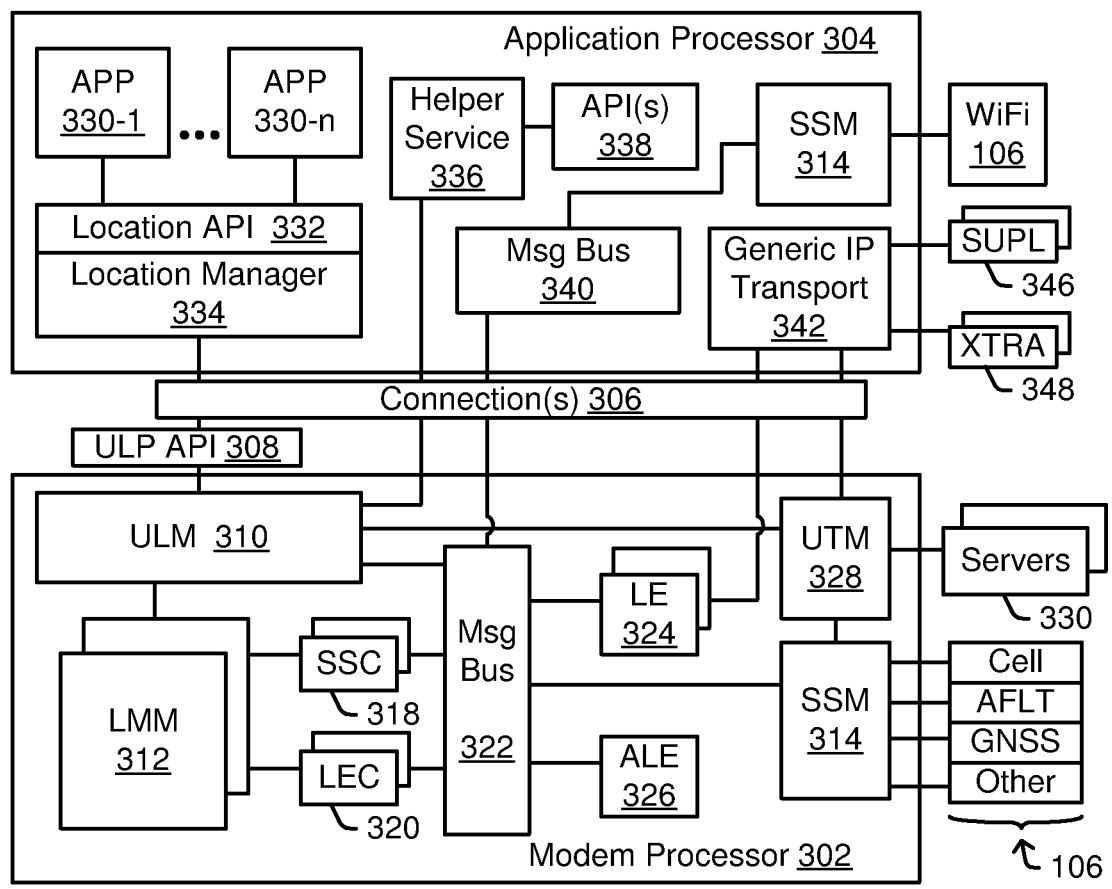
FIG. 3 is a schematic block diagram illustrating certain features of an example mobile device comprising an application processor and modem processor, wherein the modem processor may use one or more available on-board positioning resources in response to a request from the application processor, wherein the selection of available resource(s) may be made in the application processor and/or modem processor, in accordance with an example implementation.

Attention is drawn next to FIG. 3, which is a schematic block diagram illustrating certain features of an example processing architecture 300 for use in a mobile device 102 comprising an application processor 304 and modem processor 302, wherein modem processor 302 may selectively use one or more available on-board positioning resources 106, e.g. In response to a request from application processor 304, in accordance with an example implementation.

Application processor 304 may host a plurality of applications 330 which use location estimates and/or position fix information obtained using any one or more of several positioning resources 106 as discussed herein. Such applications 330 (illustrated as APP 330-1 through APP 3-30-n) may comprise, for example, one or more navigation applications, one or more search functions, one or more advertising applications, just to provide a few examples. In a particular illustrated implementation, application processor 304 may communicate with modem processor 302 through one or more connections 306 (e.g., a system bus, etc.). Thus, for example, one or more applications 330 may interact with and/or communicate with entities hosted on modem processor 302 through a location Application Programming Interface (API) 332 and location manager 334, which may be hosted on application processor 304, and through a unified location platform (ULP) API 308.

Accordingly, one or more applications 330 may initiate one or more requests for a position fix from a unified location manager (ULM) 310. In other implementations, applications 330 may request of ULM 310 to provide periodic position fixes. Such requests for a position fix from ULM 310 may also indicate a desired level of accuracy and/or timeliness (e.g., as determined from "time-to-fix"), just to provide a couple of examples of desired characteristics that may be indicated in or by such requests. Subject to the availability of positioning resources 106 to satisfy a request, e.g., by meeting such desired characteristics, ULM 310 may select and/or allocate one or more specific technologies (e.g., positioning resources 106) to obtain a position fix satisfying a request.

According to an example implementation, ULM 310 may satisfy desired characteristics in a request by selecting one or more location method managers (LMMs) 312. LMMs 312 may, for example, define particular distinct methodologies for obtaining measurements for use in computing position fixes. Such methodologies may include, for example, processing of SPS signals to multiple satellite transmitters for obtaining pseudorange measurements, obtaining measurements of ranges to terrestrial base stations for use in AFLT, processing signals transmitted by Wi-Fi access points and/or the like for obtaining information for use in computing a position fix, obtaining a position fix by obtaining sector cell ID information (e.g., from an acquired pilot signal transmitted from terrestrial base stations), processing signals transmitted by other electronic devices in proximity to mobile device to obtain a position fix related information (e.g., using location information from another device that may be in an ad hoc network with the mobile device, using location information from another device that may be close enough to the mobile device for a near field or and/or other like wireless signal reception/exchange), a hybrid position techniques using two or more of the aforementioned techniques, just to name a few non-limiting examples of position determination methodologies that may be used.

Here, LMMs 312 may be capable of commanding system resources (e.g., processing resources, wireless interfaces, battery resources, sensors, etc.) for obtaining information such as measurements for use in computing a position fix. Here, an LMM 312 may signal one or more subsystem controllers (SSC) 318 to activate resources for use in obtaining information (e.g., acquiring signals) that may be used in obtaining position fixes. Similarly, an LMM 312 may signal to one or more location estimator controllers (LEC) 320. Here, LECs 320 may configure processing resources for obtaining/computing position fixes based, at least in part, on information such as measurements obtained through actions of one or more LMMs 312 as discussed above.

As illustrated in FIG. 3, one or more subsystem message buses 322 and/or 340 may be provided to support ULM 310, SSCs 318, and LECs 320. Here, for example, as shown subsystem message bus 322 in modem processor 302 may further couple to one or more location estimators (LEs) 324, SSM 314, and an aggregating location estimator (ALE) 326. Here, SSM 314 is illustrated as relating to one or more positioning resources 106 using one or more of a cellular sector, AFLT, GNSS, and/or other like position determine methodology. Further, for example, as shown subsystem message bus 340 in application processor 304 may be coupled to subsystem message bus 322, e.g. via connections 306, and to an example SSM 314 which in this instance relates to one or more positioning resources 106 using Wi-Fi signaling-based position determine methodology. LE 324 and a unified transport manager (UTM) 328 are also shown as being coupled via connections 306 to a generic IP transport 342 of application processor 304, which may provide further access to other positioning resources, represented here by SUPL capability 346 and XTRA capability 348 that may use certain other position determine methodologies. Similarly, UTM 328 is shown as possibly providing further access to one or more servers 330 which may also provide additional information that may be considered in determining a position fix. Additional assistance in obtaining and/or providing information relating to a position fix may be provided to ULM 310 through connections 306 via a helper service 336 within an application processor 310 which may access further APIs 338, e.g., such as a HLOS API, other third-party APIs, etc.

Figure 4:
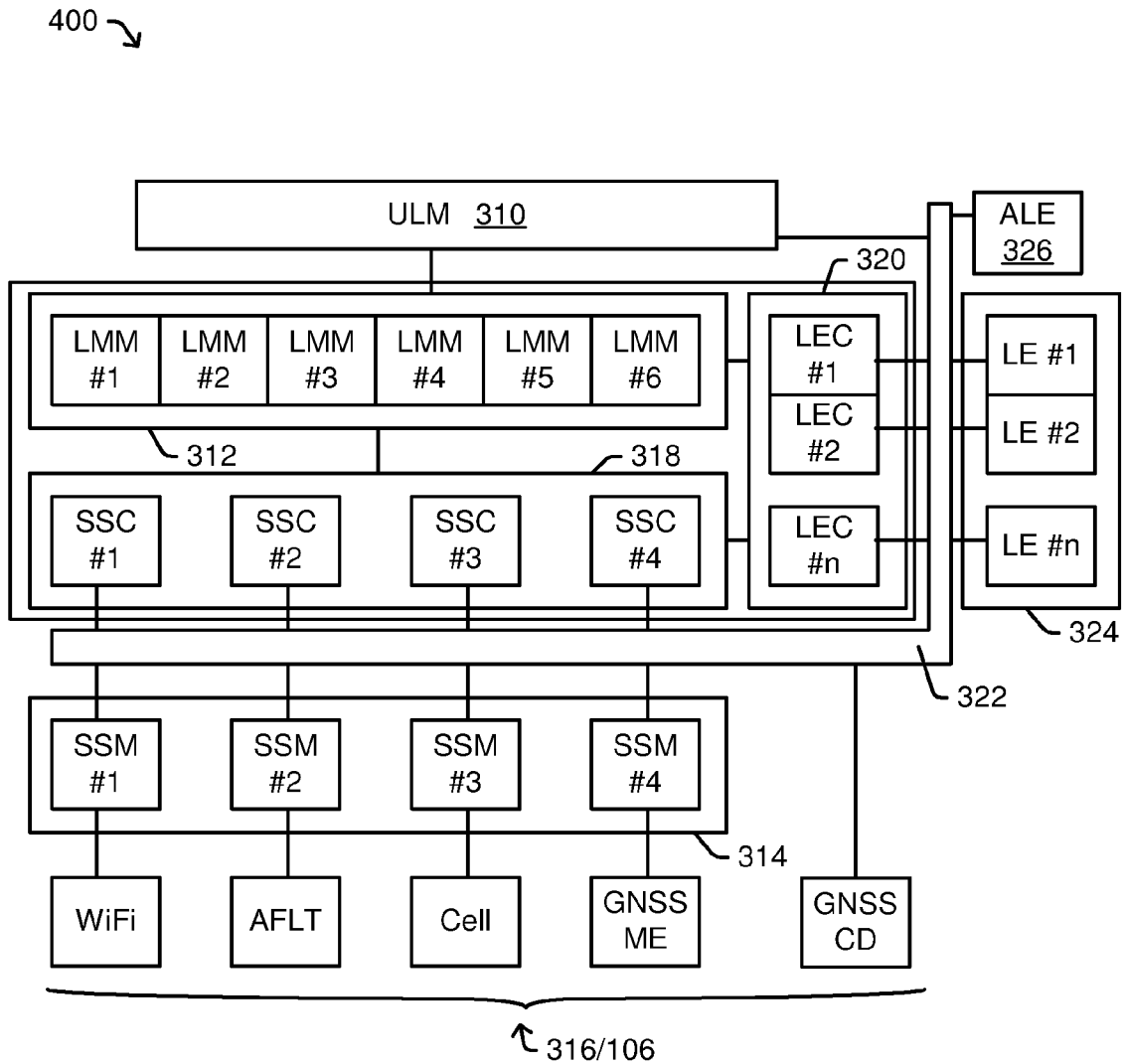
FIG. 4 is a schematic block diagram illustrating certain features of an example modem processor providing a plurality of management capabilities through which selective use of one or more available on-board positioning resources may be implemented, in accordance with an example implementation.

Attention is drawn next to FIG. 4, which is a schematic block diagram illustrating certain features of an example modem processor 400 providing a plurality of management capabilities through which selective use of one or more available positioning resources 106 may be implemented, in accordance with an example implementation.

In a particular implementation, LMM 312 may maintain attributes associated with a particular positioning resource and/or associated location determination methodologies. For example, an LMM 312 may store one or more records in memory indicating one or more attributes and/or an operational state associated with a particular positioning resource and/or associated location determination methodology. In some implementations the attributes and state of a particular positioning resource may be static. In other implementations, one or more attributes associated with a positioning resource and/or an operational state associated with a positioning resource and/or mobile device (and/or some position determination methodology associated there with) may be updated in response to changing conditions or events. In handling a request from an application 330 to provide a position fix, ULM 310 may select one or more LMMs 312 to obtain information such as measurements for use in performing this task. As discussed above, requests from applications 330 may be associated with one or more particular position fix criteria. Accordingly, ULM 310 may select from among available LMMs 312 that meet or exceed the particular position fix criteria established or set forth in requests from applications 330. Here, ULM 310 may examine specific attributes or states maintained by the LMMs 312 to determine which, if any LMMs 312, a be capable of providing a resource to obtain information (e.g., such as measurements for use in computing position estimates) that satisfy one or more of the desired characteristics for a position fix position fix indicated by a given request.

As shown in FIG. 4, an LMM 312 may direct one or more messages to one or more SSCs 318 to request actions in connection with obtaining information through one or more positioning resources 106. In a particular non-limiting example implementation, an SSC 318 may be dedicated to directing/controlling a single SSM 314. As shown in FIG. 4, a positioning resource 106 may include related hardware, software and/or wireless interface circuitry for obtaining information for use in computing a position fix. In particular implementations, a positioning resource 106 may be capable of obtaining measurements and/or information that may be used for computing a position fix for mobile device 102. For example, a positioning resource 106 may include a WiFi subsystem comprising circuitry and/or processing for communicating with IEEE Std. 802.11 access points and/or the like. A positioning resource 106 may also comprise circuitry and/or processing for receiving and processing signals received a cellular base station and/or the like. For example, a positioning resource 106 may comprise an AFLT subsystem to obtain measurements to be processed for computing a range to a base station at a known location for performing a location estimate using AFLT. Alternatively, a positioning resource 106 may comprise a sector-cell-ID subsystem to acquire a pilot signal transmitted from a base station including being modulated with a cell ID which is representative of a base station at a known location. A positioning resource 106 may also include a GNSS measurement engine (ME) subsystem comprising circuitry and/or processing resources capable of acquiring signals transmitted from a satellite positioning system to obtain pseudorange measurements to space vehicle having transmitters thereon. As known to those of ordinary skill in the art, such pseudorange measurements may be used for computing a location estimate or position fix. Information obtained from positioning resources 106 for use in computing a position fix (e.g., from acquiring signals transmitted from IEEE Std. 802.11 access points, cellular base stations, and/or SPS transmitters) may be routed through subsystem message bus 322 to one or more LEs 324. LEs 324 may compute the location estimate (e.g., indicative of and/or relating to a position fix) using information obtained from one or more positioning resources 106. In certain example instances, an LE 324 may be capable of applying one or more algorithms and/or heuristic algorithms for computing a location estimate and/or position fix. In other implementations, one or more positioning resources 106 may also include or otherwise make use of one or more sensors 216 (FIG. 2) such as, for example, an inertial sensor comprising one or more accelerometers, gyroscopes and magnetometers, just to name a few examples. It should be understood that specific subsystems to provide measurements and/or information to be used in computing a position fix are merely examples provided for the purpose of illustration, and that claimed subject matter is not limited in these respects.

In an example implementation, an SSC 318 may receive a selection from one or more LMMs 312 to obtain information or measurements for use in performing a location service such as obtaining a position fix. Here, in addition to activating or configuring a particular positioning resource 106 through a corresponding SSM 314, a particular SSC 318 may also configure an appropriate LE 324, e.g., through a corresponding LEC 320. Here, for example, an LE 324 may be capable of applying any one of several algorithms, heuristics, computation techniques, etc. for computing a solution based, at least in part, on measurements and/or information obtained from one or more positioning resources 106.

As pointed out above, modem processor 302 may provide a plurality of positioning resources 106 which may use various methodologies for obtaining a position fix using any one of several combinations of technologies or modes. In a particular implementation shown in FIG. 4, an LMM 312 may be capable of signaling to and/or commanding a one or more SSCs 318 and/or LECs 320. In a particular implementation, an LMM 312 may decide which positioning resources 106 and/or LEs 324 are to be enabled and/or employed. In a particular implementation, an LMM 312 may have knowledge and/or access to a description of how particular SSCs 318 and LECs 320 are to be employed. Here, for example, an LMM 312 may be statically pre-programmed and/or otherwise affected in some manner with certain capabilities of SSCs 318 and LECs 320 to support certain particular position determination methodologies. Upon determining such particular modes to be employed and/or enabled, an LMM 312 may provide configuration commands to one or more SSCs 318 (e.g., to command/configure an associated positioning resource 106) and/or configuration commands to one or more LECs 320 (e.g., to command/configure an LE 324).

In certain example implementations, an LMM 312 may monitor a status of associated LEs 324 and positioning resources 106, and report there from one or more attributes and states to ULM 310. In certain example implementations, ULM 310 may determine desired position fix characteristics for active location clients (e.g., applications 330). Such desired characteristics may be based upon particular requests received from active client applications 330. In certain instances, ULM 310 may compare or otherwise apply certain desired characteristics of the outstanding current location client applications 330 to one or more attributes and/or states of positioning resources 106 for determining which one or more LMMs 312 may be employed for obtaining information and/or measurements for use in computing a position fix that may satisfy one or more particular requests.

In certain example implementations, an LMM 312 may have a dedicated LE 118 or share an LE 118 with other LMMs 312. In a particular non-limiting example implementation, an LEC 320 may be dedicated to directing/controlling a single LE 324. Similarly, an LMM 312 may have a dedicated positioning resource 106 or share a positioning resource 106 with other LMMs 312. Likewise, multiple LMMs 312 may share the same positioning resource 106 and may attempt to configure the shared positioning resource 106 differently. In a particular implementation, an LMM 312 may have only one outstanding active command to any particular SSC 318 or LEC 320 at any one time, and newly issued commands may overwrite an existing command. An LMM 312 may be enabled or disabled by ULM 310. In a particular implementation, one LMM 312 may not enable or disable another LMM 312.

Table 1 below summarizes some example location determination methodologies that may be configured and/or implemented by an LMM 312 according to particular example implementations. Here, Table 1 also shows how particular pairs of LECs 320 and SSCs 318 may be used and/or configured to implement a particular associated location determination methodology of a particular LLM 116.

TABLE 1

| LMM | LEC/LE | SSC/SSM | POSITIONING RESOURCE |
|---|---|---|---|
| GNSS Mobile Station Based (MSB) (including stand-alone, standalone with predicted orbits, MSB) | GNSS | GNSS-MSB | GNSS |
| GNSS Mobile Station Assisted (MSA) | | GNSS-MSA | GNSS |
| Terrestrial Location Engine (TLE) | TLE | Sector-Cell-ID | Sector-Cell-ID |
| WiFi MSB | WiFi | WiFi | WiFi |
| AFLT MSA | | AFLT | AFLT |

A particular SSC 318 may be responsible for generating and sending appropriate commands to a particular SSM 314 to control a particular operation of a particular positioning resource 106, e.g., based upon commands received from an LMM 312 and/or one or more external events (e.g., signal from a wake-up timer). In a particular example implementation, an SSM 312 may support only one command at any time and a newly received command may overwrite an existing command. Since multiple LMMs 312 may share the same positioning resource 106 and configure the particular positioning resource 106 differently, an associated SSC 318 may merge multiple configuration requests into a single command and send that command to the associated SSM 314 to control the operation of the associated positioning resource 106. An SSC 318 may also be responsible for implementing features specific to a particular positioning resource by sending appropriate commands to an associated SSM 314, associated LEC 320 and other functional entities.

Certain example implementations, ULM 310 may continuously and/or at certain selected times evaluate LMM 312 for attributes and states relating to one or more positioning resources 106 to select an appropriate/available position determination methodology to be used in meeting certain desired characteristics of outstanding request for a position fix. Based, at least in part, on a selected position determination methodology, ULM 310 may determine particular positioning resources 106 to be enabled, and may initiate commands to configure particular LMM(s) 312 accordingly.

In certain example implementations, ULM 310 may send a message to each LLM 116 requesting current available attributes and/or states associated with one or more positioning resources. Upon receiving such a message, an LMM 312 may respond with a message to each SSC 318 that is used by this particular LMM 312 for a particular location determination methodology. In response to this request from the LMM 312 an SSC 318 may send another message to its associated SSM 314 to request such attributes and/or states. Once an SSM 314 is identified attributes and/or states of one or more positioning resources, it may report such information to applicable SSC 318, which may further report such information back to the requesting LMM 312.

Having received response messages from applicable SSCs 318 as to particular attributes and states of available positioning resources 106, an LMM 312 may subsequently send a message to the ULM 310 to report such current attributes and/or states. Having received messages from LMMs 312 reporting attributes and/or states, ULM 310 may evaluate available position determination methodologies (as reported by LMMs 312) in terms of attributes and/or states (e.g. which may define certain available position fix criteria) with certain desired characteristics associated with a request for position fix. ULM 310 may send a message to a selected LMM 312 to initiate a particular associated position determination methodology, e.g. via one or more positioning resources 106. Responsive to receiving such a message from ULM 310 to initiate the particular location determination methodology, an associated LMM 312 may decide which positioning resources 106 and LEs 324 are to be enabled and configured. LMM 312 may, for example, provide messages to one or more SSCs 318 and one or more LECs 320 to enable and/or configure the appropriate positioning resources 106 and/or LEs 324. On receiving a configuration message from an SSC 318, an SSM 314 may configure and activate its associated positioning resource 106. Similarly, responsive to receiving a message from an LEC 320, an LE 324 may commence computing a position fix and/or the like, e.g. on a periodic basis.

In certain example implementations, an ALE 326 may select a particular position fix generated by one or more LEs 324, which may be provided in a response from ULM 310 to a respective requesting application 330. In an example implementation, ULM 310 may perform certain quality of service checks on new position fixes, and provide these position fixes to one or more requesting applications 330 according to their particular desired characteristics in light of the available attributes and/or states, e.g. as discussed above.

In certain example implementations, ULM 310 may evaluate certain attributes and/or states for available positioning resources 106 against certain desired characteristics for a request for position fix from an application 330 and select an appropriate position determination methodology of a positioning resource 106 to be used in determining a position fix. Accordingly, in certain implementations a ULM 310 may choose to continue using a current operating LMM 312 or change to employing a different LMM 312. If ULM 310 chooses to continue with operation of a current LMM 312, ULM 310 need not take any action. However, if ULM 310 chooses to use different LMMs 312, ULM 310 may send messages to turn on or turn off or activate or deactivate particular LMMs 312.

Figure 5:
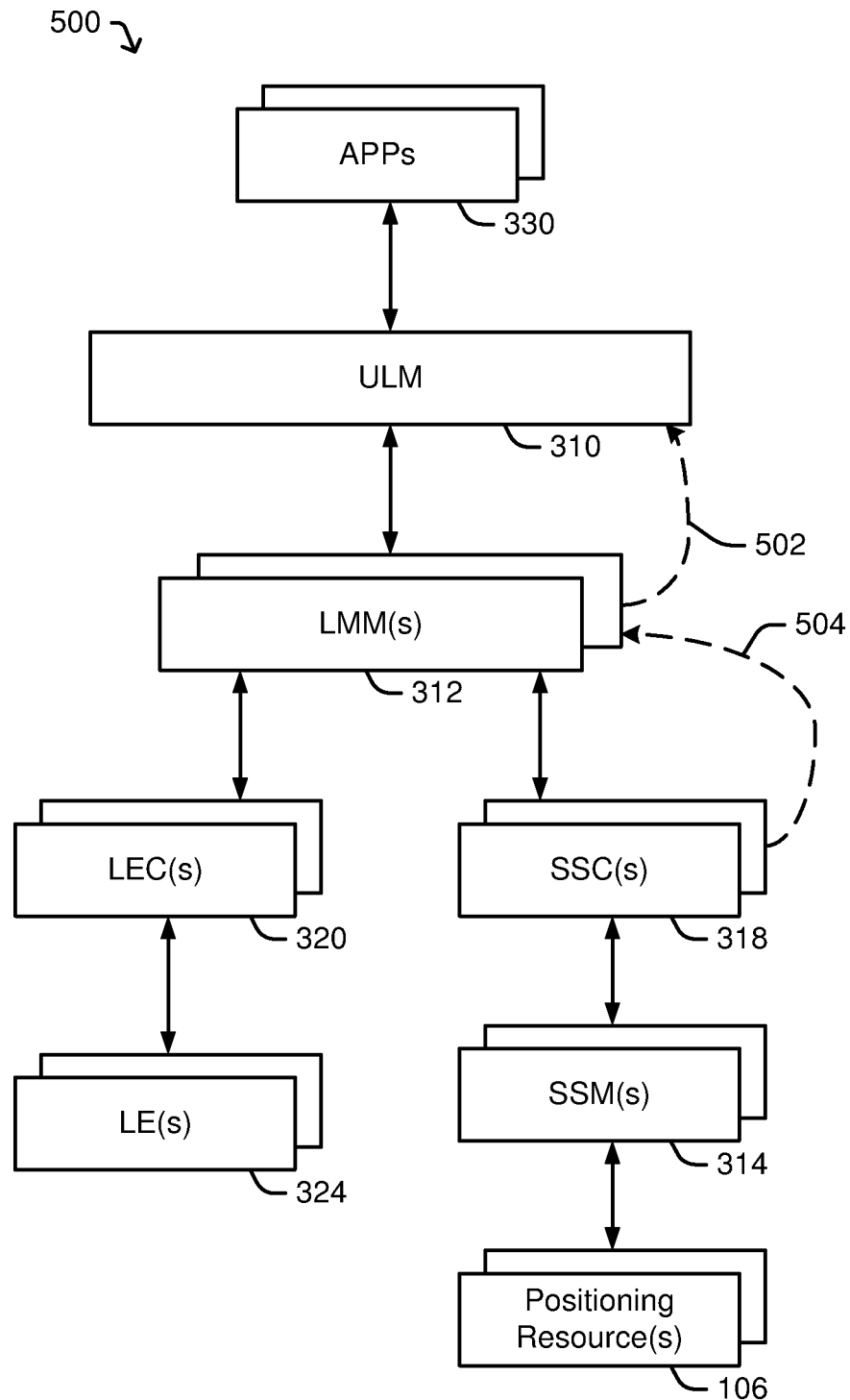
FIG. 5 is a schematic block diagram illustrating certain features of an example processing scheme for a plurality of management capabilities through which selective use of one or more available on-board positioning resources may be implemented, in accordance with an example implementation.

Attention is drawn next to FIG. 5, which is a schematic block diagram illustrating certain features of an example processing scheme 500 for a plurality of management capabilities through which selective use of one or more available positioning resources may be implemented, in accordance with an example implementation.

Processing scheme 500, further illustrates certain advantages is provided in the example implementations of FIGS. 3 and 4. As illustrated at one or more applications 330 may communicate one or more requests for a position fix to ULM 310. The one or more requests may be indicative of one or more desired characteristics that the application has for the position fix. ULM 310 may compare the desired characteristics for a given request to attributes and/or states as reported with regard to one or more available positioning resources 106. ULM 310 may direct one or more LMMs 312 in some manner to initiate obtaining a position fix for a given request. In response, an LLM 312 may direct one or more LECs 320 to use one or more LEs 324 in some manner in obtaining a position fix for a given request. Further, in response, an LLM 312 may direct one or more SSCs 318, which direct one or more SSMs 314 to use one or more positioning resources 106 to support obtaining a position fix for the given request. Hence a positioning resource 106 may provide applicable information (e.g., measurements, etc.) back-up through the hierarchical processing scheme and/or otherwise to LEs 324. ULM 310 may subsequently provide a position fix to a requesting application in response to the given request. As further illustrated by the dashed arrows 504 and 502, respectively, attributes and/or states associated with one or more positioning resources 106 obtained by an SSC 318 provided to ULM 310 via an applicable LMM 312.

As discussed above, an application 330 may provide certain desired characteristics for position fix that it requests. If there are multiple concurrent applications 330, a application may have its own desired characteristics which may or may not be distinct from those of other applications. Thus, certain desired characteristics may apply only to a particular application 330 that specifies a request. If an application 330 doesn't specify its particular desired characteristics via request for position fix, one or more default characteristics may be assigned to it. Table 2 below summarizes some example desired characteristics that may be attributed to a particular currently operating application. In certain example implementations, one or more attributes for a positioning resource 106 may also be indicative of similar information in the form of one or more position fix criteria that may be provided by the positioning resource.

TABLE 2

| Field | Description |
|---|---|
| recurrence_type | Recurrence type: SINGLE-SHOT or PERIODIC. Default is PERIODIC. |
| preferred_GNSS_mode | Specifies the preferred GNSS operation mode as one of the following: None<br>MSA<br>MSB<br>MS-Standalone<br>0x04 = MS-Standalone- plus predicted orbits<br>(Default is "None"). |
| preferred_response_time | Preferred maximum response time of the first fix in ms. Default is 30,000 ms. |
| min_interval | For interval based notification type. Minimal time passed for notification of new position; unit in ms. Default is 1,000 ms. |
| preferred_hor_pos_accuracy | Preferred horizontal position accuracy as one of the following:<br>HOR_POS_ACCURACY_DONT_CARE<br>HOR_POS_ACCURACY_LOW<br>HOR_POS_ACCURACY_MEDIUM<br>HOR_POS_ACCURACY_HIGH<br>HOR_POS_ACCURACY_BEST<br>(Default is "HOR_POS_ACCURACY_DONT_CARE"). |
| preferred_power_consumption | Preferred power consumption as one of the following:<br>POWER_CONSUMPTION_DONT_CARE<br>POWER_CONSUMPTION_LOW<br>POWER_CONSUMPTION_MEDIUM<br>POWER_CONSUMPTION_HIGH<br>(Default is "POWER_CONSUMPTION_DONT_CARE"). |
| preferred_altitude_accuracy | Preferred altitude accuracy as one of the following:<br>ALT_ACCURACY_DONT_CARE<br>ALT_ACCURACY_LOW<br>ALT_ACCURACY_HIGH<br>(Default is "ALT_ACCURACY_DONT_CARE".) |

Figure 6:
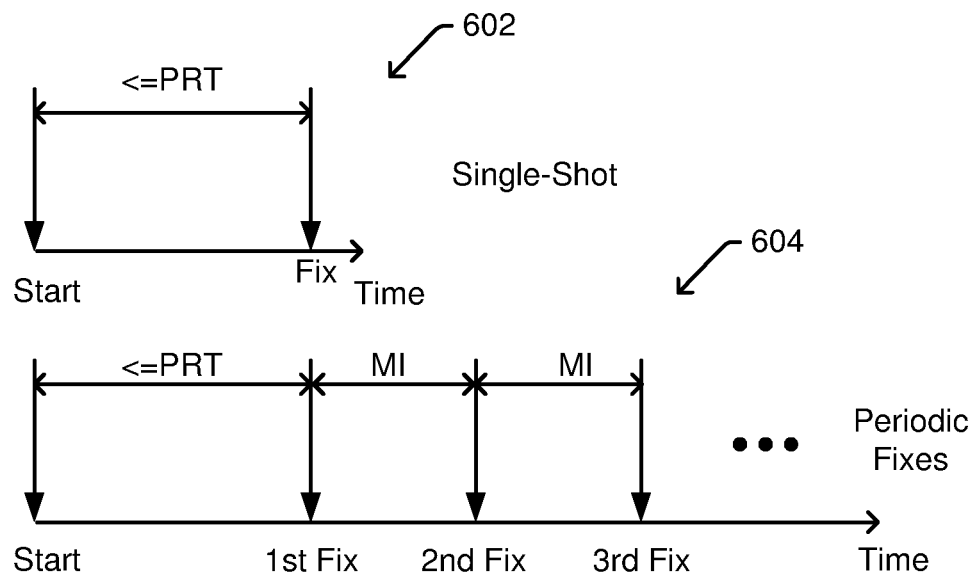
FIG. 6 shows two timeline diagrams illustrating some example timing techniques for obtaining an example single shot position fix at a particular point in time and/or a plurality of example periodic position fixes over a period of time via a selective use of one or more available on-board positioning resources, in accordance with an example implementation.
Figure 7:
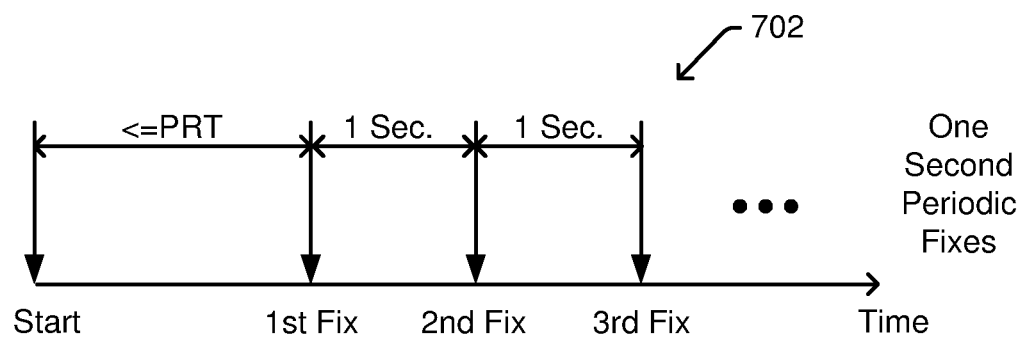
FIG. 7 is a timeline diagram illustrating some example timing techniques for obtaining a plurality of example periodic position fixes at one second intervals following a first position fix via a selective use of one or more available on-board positioning resources, in accordance with an example implementation.

One particular desired characteristic/position fix criteria as identified in Table 2 is a preferred response time or time to fix. As shown in FIGS. 6 and 7, certain preferred response times may be defined differently depending, at least in part, on whether the position fix criteria specifies a single shot position fix or periodic position fixes. Here, a preferred response time for single shot may be defined by just a single value PRT, e.g. as illustrated in timeline 602. For a periodic position fix however, a preferred response time may be defined for a first position fix, and minimum intervals (MIs) may be defined for the following position fixes as illustrated in timeline 604. By way of further example, FIG. 7 shows an example timeline 702 comprising minimum intervals of one second. It should be kept in mind, however, that while such timelines provide certain examples in certain other example implementations positioning fixes for one or more applications may be scheduled in other ways, which may or may not result in a defined periodicity. Thus, for example, in certain implementations it may be useful to schedule certain position fixes at times based, at least in part, on one or more mathematical functions or formulas, which may or may not be distributed evenly over a period of time.

As discussed above, LMMs 312 may, for example, forward messages from time to time indicating attributes and/or states of a positioning resource 106. Some examples of items in such messages are shown in Table 3 below:

TABLE 3

| Field | Description |
|---|---|
| LMM_ID | LMM Identifier |
| expected_power_consumption | Expected power consumption (very_high, high, medium, low) |
| expected_TTFF | Expected best achievable time-to-first-fix (TTFF) in s |
| expected_pos_accuracy | Expected achievable position accuracy (very_high, high, medium, low, very_low, noFix) |
| expected_pos_availability | Expected position availability (high, medium, low, noFix) |
| expected_network_needs | Expected network assistance data needs (high, medium, low, no) |
| Current_state | Current LMM state: GOOD (e.g. strong signal environment for GNSS; very dense WiFi area); POOR (e.g. GNSS_WEAK; spare WiFi area); UNKNOWN (available but its state is unknown); FAILED (e.g. GNSS_FAILED, WiFi_FAILED); IN_SLEEPNOT_AVAILABLE. |

To obtain information representative of an attribute and/or a state associated with a positioning resource 106, an LMM 312 may request such information from an applicable SSC 318. The clickable SSC 318 may then respond with a message to LMM 312 as represented by dashed line 504 in FIG. 5, and which may be based on the example information as shown in Table 4 below:

TABLE 4

| Field | Description |
|---|---|
| SSC_ID | SSC Identifier |
| expected_power_consumption | Expected power consumption (very_high, high, medium, low) |
| expected_TTFF | Expected best achievable time-to-first-fix (TTFF) in s |
| expected_pos_accuracy | Expected achievable position accuracy (very_high, high, medium, low, very_low, noFix) |
| expected_pos_availability | Expected position availability (high, medium, low, noFix) |
| expected_network_needs | Expected network assistance data needs (high, medium, low, no) |
| Current_state | Current subsystem state: GOOD (e.g. strong signal environment for GNSS; very dense WiFi area:); POOR (e.g. GNSS_WEAK; spare WiFi area; UNKNOWN (available but its state is unknown); FAILED (e.g. GNSS_FAILED, WiFi_FAILED); IN_SLEEP; NOT_AVAILABLE |

To obtain information attribute and state information associated with a particular SSM 314 and associated positioning resource 106, an SSC 318 may request such information from SSM 314. In response to such a request, the SSM 314 may respond to the requesting SSC 318 with information indicating certain attributes and/or states associated with positioning resources 106, e.g. based on one or more examples as shown in Table 5 below:

TABLE 5

| Field | Description |
|---|---|
| SSM_ID | SSM Identifier |
| expected_power_consumption | Expected power consumption (very_high, high, medium, low) |
| expected_TTFF | Expected best achievable time-to-first-fix (TTFF) in s. |
| expected_pos_accuracy | Expected achievable position accuracy (very_high, high, medium, low, very_low, noFix) |
| expected_pos_availability | Expected position availability (high, medium low, noFix) |
| expected_network_needs | Expected network assistance data needs (high, medium, low, no) |
| Current_state | Current subsystem state: GOOD (e.g. strong signal environment for GNSS; very dense WiFi area); POOR (e.g. GNSS_WEAK; spare WiFi area); |

TABLE 5-continued

| Field | Description |
|---|---|
| | UNKNOWN (available but its state is unknown); FAILED (e.g. GNSS_FAILED, WiFi_FAILED); IN_SLEEP; NOT_AVAILABLE |

As discussed above, an LMM 312 may communicate with one or more SSCs 318 and one or more LECs 320. For example, LMM 312 may provide on or off messages to either an SSC 318 or an LEC 320 to activate, enable and/or power on associated SSMs 314 and positioning resources 106 as well as LECs 320 and LEs 324.

As discussed above, an LMM 312 may obtain certain attributes and/or states associated with modes of operation of mobile device 102 and/or one or more positioning resources 106. In one example, a Wi-Fi mode of operation and status, associated with Wi-Fi-based positioning resource, may be defined by a cold start (e.g., without appropriate tiles indicating locations of access points within range), a hot start (e.g., with appropriate tiles indicating locations of access points within range), an unknown start mode (with tiles but not certain whether the particular tiles are correct). Wi-Fi related attributes for an initial position fix may be shown in Table 6 below according to a particular non-limiting example.

TABLE 6

| Attributes | Hot Start | Cold Start | Unknown Start Mode |
|---|---|---|---|
| Expected Power Consumption | High | High | High |
| Best Achievable TTF | 1 second | <10 seconds | 1 second or <10 seconds |
| Achievable Position Accuracy | Medium for dense WiFi area; low for sparse WiFi area; no fix for no WiFi area | | |
| Achievable Position Availability | Medium for dense WiFi area; low for sparse WiFi area; no fix for no WiFi area | | |
| Subsystems_to_use | WiFi | | |
| Network Assistance Data Needs | No | Medium | No or medium |

Similarly, a GNSS mode of operation for GNSS ME positioning resource and status may be defined as one or more of a cold start, a hot start, a warm start, an assisted GNSS, or possibly as in-acquisition. Particular attributes associated with these different modes of operation may be summarized by particular examples as shown in Table 7 below:

TABLE 7

| Attributes | Hot Start | Cold Start | Warm Start | Assisted |
|---|---|---|---|---|
| Expected Power Consumption | High | High | High | High |
| Best Achievable TTF | 1 second | 30 seconds | 30 seconds | 10 seconds |
| Achievable Position Accuracy | High for strong signal; Medium for medium signal; low for weak signal; no fix for no signal | | | |
| Achievable Position Availability | High for strong signal; Medium for medium signal; low for weak signal; no fix for no signal | | | |
| subsystems_to_use | GNSS | | | |
| Network Assistance Data Needs | No | No | No | Medium |

For cellular sector ID-based positioning resources, particular modes of operation may include, for example, a cold start (without appropriate base station almanac information including, for example, locations of base stations and associated identification information), a hot start (with appropriate base station almanac information), or an unknown start mode (with base station almanac information with uncertainty as to whether the particular base station almanac information is correct). Particular attributes for these particular modes of operation may be illustrated by example in Table 8 below:

TABLE 8

| Attributes | Hot Start | Cold Start | Unknown Start Mode |
|---|---|---|---|
| Expected Power Consumption | Low | Low | Low |
| Best Achievable TTF | 1 second | <10 seconds | 1 second or <10 seconds |
| Achievable Position Accuracy | | Very low (HOR_POS_ACCURACY_DONT_CARE) | |
| Achievable Position Availability | | High | |
| Subsystems_to_use | | Cell-ID | |
| Network Assistance Data Needs | No | Medium | No or medium |

In a particular implementation, an LMM 312 may support only a single command from ULM 310 at any particular time, and a newly received command may override an existing command. In a particular implementation, ULM 310 may send commands to an LMM 312 particular instances if ULM 310 is attempting to change current behavior of the LMM 312. Accordingly, if ULM 310 selects the same LMM 312 for multiple applications 330 having different desired characteristics identified in their respective requests for position fix, ULM 310 may merge multiple desired characteristics into a single command to be sent to LMM 312 for controlling a particular selected position determination methodology. In a particular example, ULM 310 may determine particular parameters from multiple desired characteristics such as a preferred response time or next expected fix time. For response time, for example, a position determination methodology may include identifying a minimum value of preferred response times defined in a request for position fix for which ULM 310 is selecting this particular LMM 312. In other words, a shortest preferred response time from among multiple current request for multiple application may be selected as the particular parameter representing a desired characteristic. A minimum value of a next expected fix report time of the current location clients may be selected for this particular LMM 312. Here, from a particular parameter representing the desired character mistake, a next expected fix report for all active clients may be determined. To meet the requirements of all active clients, a minimum value of the next expected fix report times may be selected as the next report time for this particular LMM 312.

In a particular implementation, a GNSS ME-based positioning resource may be used in combination with Wi-Fi-based positioning resource, e.g., while initiating a GNSS ME from a cold start. For example, if the position uncertainty is less than a predetermined threshold it may be desirable to operate a Wi-Fi positioning resource to possibly reduce the position uncertainty. After a position fix is computed from information or measurements provided by WiFi positioning resource, the GNSS ME positioning resource may continue without the Wi-Fi positioning resource.

According to an implementation, ULM 310 may evaluate position determination methodologies associated with LMMs 312 according to certain events or conditions subject to desired characteristic defined by outstanding request from applications 330 as discussed above. Such events or conditions may include, for example, addition of a new current application 330, an application 102 having been deleted or completed, a final position fix having been reported, a new position fix is desired in the near future, desired characteristics having been modified somehow (e.g., via a new request), a time out condition having been reached, and/or particular attribute and/or state having changed, just to name a few examples. In a particular implementation, ULM 310 may select an appropriate position determination methodology associated relating to one or more positioning resources 106 and an LMM 312 by maintaining and propagating a subsequent expected fix information of outstanding location client applications 330.

As discussed above, in certain example implementations ULM 310 may select an LMM 312 to obtain a position fix meeting desired characteristics in a request from among multiple LMMs 312. According to a particular implementation, ULM 310 may select a particular LMM 312 from among LMMs 312 that are available (e.g., not related to being in a sleep or failed state) according to a multi-stage approach. First, if a request for position fix forces a particular operational mode that forces use of a particular LMM 312 (e.g., the particular LMM 312 is specified by desired characteristics established by the requesting application 330, or a time-to-fix requirement or goal forces selection of a particular available LMM 312), ULM 310 will attempt to select that particular LMM 312. Second, if no such operational mode forces use of a particular LMM 312, ULM 310 may select from among available LMMs 312 that provide position accuracy that meets an accuracy goal or requirement of position fix criteria established by the requesting application 330. If none of the available LMMs 312 are capable of meeting or exceeding such an accuracy goal or requirement, ULM 310 may select an LMM 312 deemed to be capable of providing the "best" available position accuracy.

Otherwise, if multiple available LMMs 312 are capable of meeting or exceeding an accuracy goal or requirement established by one or more desired characteristics in a request from an application 330, ULM 310 may select an LMM 312 that has already been selected to provide a position fix to satisfy a request from another application (in addition to being capable of meeting or exceeding the accuracy goal or requirement) to thereby "share" the LMM 312 if certain conditions are met. For example, if the expected time to obtain a position fix using a selected LMM 312 to satisfy a request of a first application is within a time-to-fix requirement of a request of a second application, a position fix provided by the selected LMM 312 may be shared and used in response to the first and second applications.

If multiple candidate LMMs 312 are available and capable of meeting or exceeding an accuracy goal or requirement as indicated by one or more desired characteristics in a request from an application 330, ULM 310 may select from among these LMMs 312 that is likely to consume the least amount of battery resources.

Figure 8:
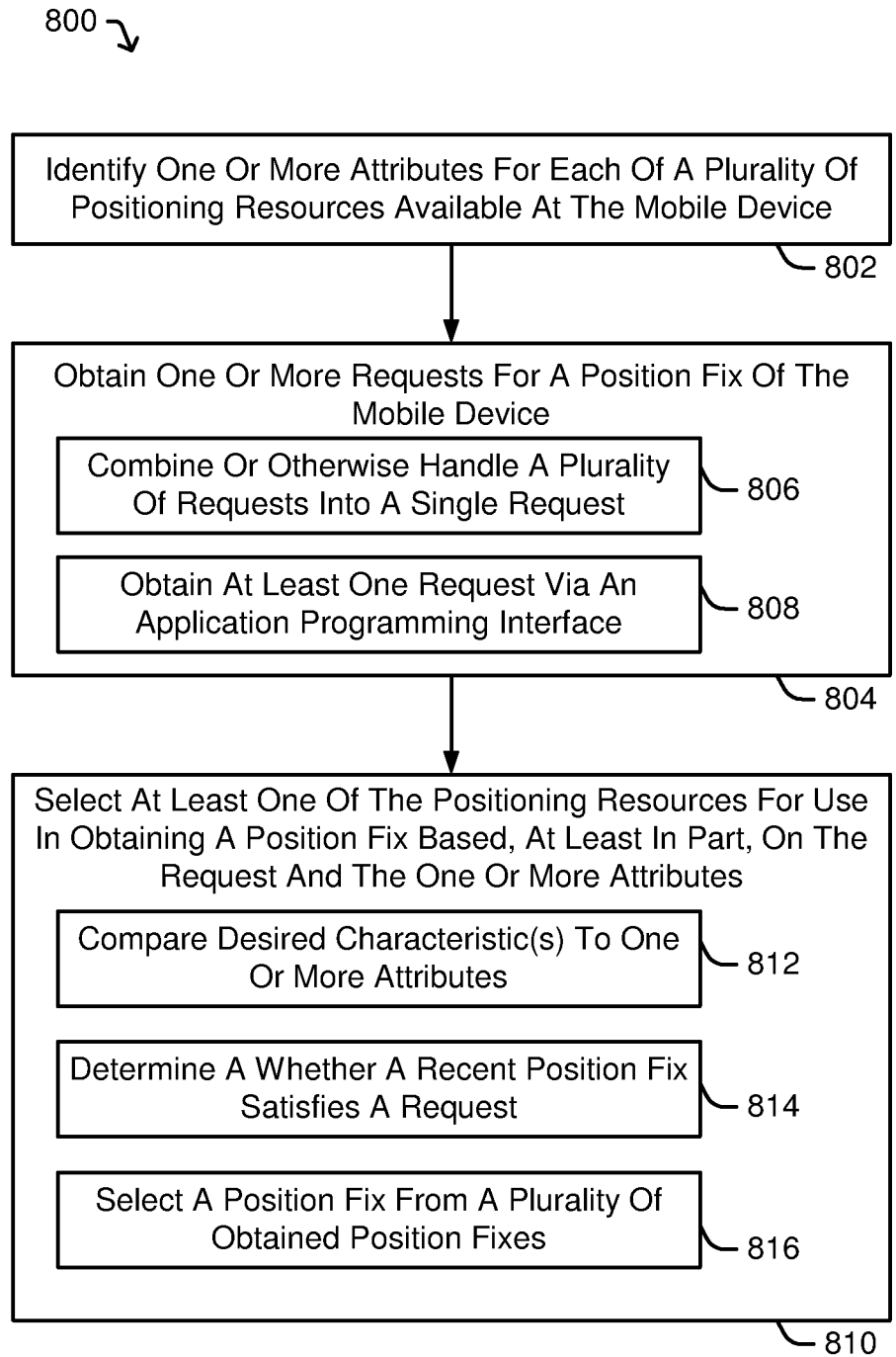
FIG. 8 is a flow diagram illustrating an example method that may be implemented in a mobile device to make selective use of one or more available on-board positioning resources, some of which may employ different position determination methodologies, in accordance with an example implementation.

Attention is drawn next to FIG. 8 is a flow diagram illustrating an example method or process 800 that may be implemented in a mobile device 102 and/or computing platform 200 to make selective use of one or more available positioning resources 106, in accordance with an example implementation.

At example block 802, one or more attributes and/or states associated each of a plurality of positioning resources available at the mobile device may be identified. For example, one or more attributes and/or states may be indicative of one or more position fix criteria, e.g., such as an expected power consumption, an expected achievable time to fix, an expected achievable position accuracy, an expected position availability, an expected position format, a use policy, a security policy, a preference policy, and/or the like or some combination thereof. By way of example, or more attributes and/or states may be identified which are associated with one or more of an SPS based positioning resource, an AFLT based positioning resource, a cell sector based positioning resource, a wireless network based positioning resource, a near-field communication based positioning resource, an ad hoc network based positioning resource, and/or the like or some combination thereof.

At example block 804, one or more requests for a position fix of the mobile device may be obtained. Example, a request for a position fix may be obtained from one or more applications/functions operating, at least in part, on the mobile device 102 and/or a computing platform 200 provided there in. In certain instances, for example at block 806, a plurality of requests may be combined into and/or otherwise handled as a single request. In certain instances, for example at block 808, at least one request may be obtained via an application programming interface.

At example at block 810 at least one of the positioning resources may be selected for use in obtaining a position fix based, at least in part, on the request and the one or more attributes/states. In certain instances, for example at block 812, certain desired characteristic(s) relating to a request for position fix may be compared to or otherwise applied to a gains one or more attributes/states. In certain instances, for example at block 814, it may be determined whether or not a recent position fix satisfies a current request for position fix. In certain instances, for example at block 816, a position fix may be selected from a plurality of obtained position fixes.

In accordance with certain further example implementations, the techniques provided herein may be used to support multiple applications 330 executing concurrently on a mobile device 102, which may request and receive position estimates and/or position fixes. Here, for example, in certain instances applications 330 may have different associated fix criteria or requirements and/or goals associated with the position fixes that they desire. In order to meet otherwise possibly exceed the fix criteria of all active outstanding applications 102, ULM 310 may, for example, evaluate the position determination methodologies indicated by the attributes of available positioning resources with regard to the desired characteristics of a position fix requested by the applications 330, and select appropriate positioning resources to execute. For example, a positioning resource may be selected in response to one or more of the following events: a new requesting application having been added; a requesting application having been deleted; a request having been completed; a position fix having been reported or otherwise made available; a new position fix being requested and/or needed soon; one or more positioning resource and/or LMM attributes and/or states having been modified; a timeout event having been reached; and/or the like or some combination thereof.

In certain example implementations, in requesting a position fix from ULM 310, an application 330 may experience a latency in receiving a position fix. Such latency may arise from a time-to-fix associated with a particular positioning resource selected for obtaining a position fix. As such, while servicing a current request for a position fix from a first application, ULM 310 may receive subsequent requests for position fixes from one or more other applications 102. With the understanding that ULM 310 may concurrently service requests for position fixes from multiple applications 330, to select appropriate positioning resource(s), ULM 310 may, in certain instances, maintain and propagate a subsequent expected fix information of all active outstanding requesting applications. Here for example, such information may indicate a next expected fix time (NEFT) for each application that reported at least one final fix, and/or a preferred_response_ time for each application that doesn't have any final fix yet. In certain example instances, ULM 310 may assume that a next expected fix time is equal to preferred_response_time plus a current time. ULM 310 may, for example, obtain one or more attributes and/or statuses of positioning resources, e.g. as illustrated below in Table 9.

TABLE 9

| Field | Values |
|---|---|
| expected_power_consumption | very_high, high, medium, low |
| expected_TTFF | in seconds |
| expected_pos_accuracy | very_high, high, medium, low, very_low, noFix |
| expected_pos_availability | high, medium, low, noFix, unknown |
| subsystems_to_use | Subsystems to be used by this PE (32 bit masks, 1 = to be used, 0 = not to be used) Bit 0: GNSS Bit 1: WiFi Bit 2: Cell-ID |
| expected_network_needs | high, medium, low, no |
| current_state | GOOD (strong signal environment for GNSS) POOR (GNSS_WEAK) UNKNOWN (available but its state is unknown) FAILED (GNSS_FAILED, WiFi_FAILED) NOT_AVAILABLE |

In certain example implementations, too select an appropriate positioning resource, ULM 310 may sort outstanding request/applications based, at least in part, according to some ranking order. For example, a ranking order may consider whether a positioning resource may or may not be dictated for a particular application, e.g. that may force a particular operation mode. For example, a ranking order may consider whether a positioning resource may or may not be dedicated for a request having a desired characteristic relating to a "highest" position fix accuracy (e.g., HOR_POS_ACCURACY_BEST). For example, a ranking order may consider whether a positioning resource may or may not be dedicated for a request for a "high" position fix accuracy (e.g., HOR_POS_ACCURACY_HIGH). For example, a ranking order may consider whether a positioning resource may or may not be dedicated for a request for a "medium" position fix accuracy (e.g., HOR_POS_ACCURACY_MEDIUM). For example, a ranking order may consider whether a positioning resource may or may not be dedicated for a request for a "low" position fix accuracy (e.g., HOR_POS_ACCURACY_LOW). For example, a ranking order may consider whether a positioning resource may or may be indicative of any particular accuracy (e.g., HOR_POS_ACCURACY_DONT_CARE).

Consequently, for example, if multiple applications 330 have requested the same preferred_hor_pos_accuracy, ULM 310 may, in certain instances, sort these requests based, at least in part, on the next expected fix time in ascending order.

Further, in certain implementations, ULM 310 may select a positioning resource for servicing each current request for a position fix from an application, one by one, according to a multiple act process, e.g., similar to and/or as illustrated in the example below. Here, ULM 310 may sequentially apply acts 1 through 5 for determining how a particular request may be serviced, e.g., should one or more of the previously mentioned events occur In an example act 1, a forced operation mode may be selected. Here, for example, a request for position fix from a (client) application may specify a particular positioning resource to be used (e.g., not merely indicating desired characteristics that may relate to certain position fix criteria such as accuracy and time to fix). If a request from a client application forces an operation mode, ULM 310 may, for example, select the forced positioning resource for servicing this request.

In an example act 2, a positioning resource that meets or exceeds certain desired characteristics may be selected. For example, if a client application does not force any specific operation mode, ULM 310 may select positioning resource(s) from among available positioning resources that may be capable of satisfying the desired characteristics and/or exceeding the desired characteristics of a request. For example, a positioning resource may provide a desired (requested) or better than the requested position accuracy, e.g., as further illustrated by a non-limiting example in the following Table 10 below.

TABLE 10

| preferred_hor_pos_accuracy | Potential Selections |
| --- | --- |
| HOR_POS_ACCURACY_DONT_CARE | very_high, high, medium, low, very_low |
| HOR_POS_ACCURACY_LOW | very_high, high, medium, low |
| HOR_POS_ACCURACY_MEDIUM | very_high, high, medium |
| HOR_POS_ACCURACY_HIGH | very_high, high |
| HOR_POS_ACCURACY_BEST | very_high, high |

If there is no positioning resource(s) that can meet the position accuracy requirement and/or other like desired characteristics pertaining to request, ULM 310 may, for example, select the positioning resource that may provide the best or closest match, e.g., best available position accuracy, etc. Here, for example, ULM 310 may select positioning resources using the following orders: very_high, followed by high, followed by medium, followed by low, which may be followed by very_low.

If multiple positioning resources may satisfy desired characteristic (e.g., meet a position accuracy requirement, etc.), ULM 310 may, for example, select at least one of the positioning resources based on the positioning resource being able to meet a TTFF requirement. If there is only one positioning resource and it is in FAILED state, ULM 310 may, for example, select another positioning method that may provide the best available position accuracy and which is not in a FAILED, or NOT_AVAILABLE state.

In example act 3, it may be determined whether one or more requests/applications may share a positioning resource and/or position fix there from.

As discussed above, ULM 310 may service request for position fixes from multiple (client) applications concurrently. In particular implementations, these multiple requests may be serviced by a single position fix to thereby "share" a position resource under certain conditions. Hence, for example, following example acts 1 and two above, if there are still multiple available positioning resources meeting the desired characteristics (e.g., position accuracy, TTFF requirements, and/or the like) of a request for a position fix, ULM 310 may, for example, select one or more positioning resources that may already have been selected for use in servicing other requests and which are not deemed FAILED, or NOT_AVAILABLE. In one example implementation, a decision to select of a positioning resource currently being used for the other previous requests may be based, at least in part, on a next expected time to fix (NEFT) associated with the particular request (or client application making request) and NEFT associated with the positioning methodology currently being used for the other position requests as follows: (NEFT of this client−NEFT of this positioning method)>.−5 seconds or other suitable time measurement.

In the particular example above, a location client application may be allowed to share a positioning resource with other client applications if it is not necessary to start the shared positioning resource too much earlier (e.g., 5 seconds or other suitable time measurement) than already scheduled for servicing requests from other client applications.

A NEFT of a positioning method may, for example, be estimated as follows: max(expected_TTFF+current time, min(NEFT of all clients selected this positioning method)).

To recap, in certain example implementations, a positioning resource servicing a previous request for a position fix may be used in servicing a new position fix request if certain conditions exist. One condition may be that an expected accuracy of a position determination methodology used in servicing the previous request meets an accuracy requirement of the new position fix request. Another condition may be that a NEFT of the new position fix request is sufficiently close in time to a NEFT of the positioning resource servicing the previous position fix request.

Accordance with certain aspects, it may be observed that a position determination methodology may consume resources (e.g., battery life, limited resources for processing signals in real-time, etc.) in the course of servicing a request for a position fix. In a particular implementation, a process of obtaining a position fix for servicing a previous position determination request may be conditionally suspended or cancelled if a position determination methodology to service a new position determination request from another application has been selected. For example, if the position determination methodology selected to service the new position determination request has an expected accuracy and/or expected time to fix meeting requirements of the previous position fix request, the process for servicing the previous request may be cancelled. Here, a position fix obtained using the position determination methodology for servicing the new request may meet accuracy and timeliness of the previous request for position fix. Accordingly, an early cancellation of the process for obtaining the position fix for servicing the previous request may conserve resources.

In example act 4, a positioning resource considered to consume the least amount of electrical power may be selected. Here, for example, the following acts 1-3, if there are still multiple positioning resources that meet the position accuracy and TTFF requirements (e.g., and/or other desired characteristics), ULM 310 may select the positioning resource(s) that may provide the lowest power consumption among these candidates. If there are still multiple candidates, ULM 310 may select any one of them.

In example act 5, a positioning resource with better than requested accuracy may be selected, e.g., if a positioning resource selected for the client application fails meet accuracy requirement. Here, for example, if a positioning resource selected for a client application/request fails to meet the accuracy requirement continuously, ULM 310 may change its "preferred_hor_pos_accuracy" value to request better accuracy. For example, if the original "preferred_hor_pos_accuracy" field is set to HOR_POS_ACCURACY_MEDIUM, ULM shall change it to HOR_POS_ACCURACY_HIGH when the continuous failure is detected. ULM 310 may, for example, count the number of continuous failures and declare "failed continuously" when the counter reaches a particular threshold. ULM 310 may, for example, reset such a counter when a position fix from an original request meets the desired characteristic for such accuracy requirement.

Thus accordance with certain implementations, a mobile device may identify a plurality of position determination methodologies available and their current attributes and/or states for servicing requests for position fixes from a plurality applications hosted on the mobile device, and schedule at least one available positioning resource to service a new request for a position fix from an application concurrently with a process to serve a previous request for a position fix from one or more other applications.

In certain example implementations, a mobile device may selectively schedule a positioning resource(s) servicing the previous request to also service a new request if a difference between NEFT of the new request and NEFT of the positioning resource servicing the previous request is less than a threshold.

In certain example implementations, a mobile device may selectively use a position fix obtained from servicing a previous request for position fix to service a new request for position fix if an expected accuracy of the position fix meets an accuracy requirement and/or other desired characteristic(s) of the new request.

In certain example implementations, a mobile device may selectively terminate a positioning resource that may be currently servicing a previous request for a position fix, and may apply a position fix obtained from one or more other positioning resources to satisfy one or more previous request for position fix.

Reference throughout this specification to "one example", "an example", "certain examples", or "example implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information (e.g., as representative data). It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics.

Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, with a mobile device:
identifying one or more attributes for each of a plurality of positioning resources available at said mobile device, wherein each of said plurality of positioning resources provides a position fix of the mobile device based, at least in part, on at least one of: one or more wireless signals received by said mobile device, or one or more signal received from one or more sensors onboard said mobile device, and wherein at least one of said plurality of positioning resources has at least one of said one or more attributes that is different than at least one other of said plurality of positioning resources;
obtaining a request for a position fix of said mobile device; and
selecting at least one of said positioning resources for obtaining said position fix based, at least in part, on said request and said one or more attributes,
wherein at least one of said one or more attributes corresponds to at least one position fix criteria that characterizes an expected power consumption,
wherein at least one of said one or more attributes further corresponds to at least one position fix criteria comprising a combination of an expected achievable time to fix, an expected achievable position accuracy, an expected position availability or an expected position format, and
wherein at least one of said one or more attributes further corresponds to at least one position fix criteria comprising a combination of a use policy, a security policy or a preference policy.

2. The method as recited in claim 1, wherein at least one said one or more attributes corresponds to an operational state of at least a portion of said mobile device.

3. The method as recited in claim 1, wherein said request for said position fix identifies one or more desired characteristics for said position fix, and wherein selecting said at least one of said positioning resources for obtaining said position fix further comprises comparing said one or more desired characteristics to at least one of said one or more attributes.

4. The method as recited in claim 3, wherein said one or more desired characteristics for said position fix comprises a desired position accuracy; a desired time to fix or a desired position format; or a combination of said desired position accuracy, said desired time to fix or said desired position format.

5. The method as recited in claim 3, wherein said one or more desired characteristics for said position fix further characterizes a requesting function with regard to a use policy; said security policy or said preference policy; or a combination of a use policy, said security policy or said preference policy.

6. The method as recited in claim 1, wherein selecting said at least one of said positioning resources for obtaining said position fix further comprises: determining whether a recent position fix satisfies said request for said position fix.

7. The method as recited in claim 6, wherein said request for said position fix is satisfied, at least in part, based on an age of said recent position fix; an accuracy of said recent position fix or a format of said recent position fix; or a combination of said age of said recent position fix, said accuracy of said recent position fix or said format of said recent position fix.

8. The method as recited in claim 6, wherein said request for said position fix is satisfied, at least in part, based on said recent position fix satisfying a use policy; said security policy or said preference policy, or a combination of a use policy, said security policy or said preference policy.

9. The method as recited in claim 1, and further comprising: in response to a determination that a recent position fix satisfies said request for said position fix, identifying said recent position fix as said position fix in response to said request for said position fix.

10. The method as recited in claim 1, wherein at least one of said plurality of positioning resources comprises a satellite positioning system (SPS) based positioning resource; an Advanced Forward Link Trilateration (AFLT) based positioning resource; a cell sector based positioning resource; a wireless network based positioning resource; a near-field communication based positioning resource or an ad hoc network based positioning resource; or a combination of an SPS based positioning resource, said AFLT based positioning resource, said cell sector based positioning resource, said wireless network based positioning resource, said near-field communication based positioning resource or said ad hoc network based positioning resource.

11. The method as recited in claim 1, and further comprising: selecting said position fix from a plurality of obtained position fixes.

12. The method as recited in claim 1, wherein said request for said position fix of said mobile device is based, at least in part, on a combination of two or more requests obtained from two or more applications or functions.

13. The method as recited in claim 1, wherein said request for said position fix of said mobile device is obtained from an application or a function by a first manager capability.

14. The method as recited in claim 13, wherein a second manager capability is responsive to said first manager capability, at least in part, in selecting said at least one of said positioning resources for obtaining said position fix.

15. The method as recited in claim 14, wherein a third manager capability is responsive to said second manager capability, at least in part, in providing at least one command to said at least one of said positioning resources for obtaining said position fix.

16. The method as recited in claim 13, wherein:
a second manager capability is responsive to said first manager capability, at least in part, in selecting said at least one of said positioning resources for obtaining said position fix;
a third manager capability is responsive to said second manager capability, at least in part, in providing at least one command to said at least one of said positioning resources for obtaining said position fix; and
said first manager capability, said second manager capability, and said third manager capability are provided, at least in part, by a modem processor in response to at least one request received from an application processor.

17. The method as recited in claim 16, wherein at least one of: said first manager capability comprises a unified location manager (ULM); said second manager capability comprises a location method manager (LMM); or said third manager capability comprises a subsystem manager (SSM).

18. The method as recited in claim 1, wherein said request is obtained from and said position fix is provided to an application programming interface capable of serving a plurality of applications or functions.

19. An apparatus for use in a mobile device, the apparatus comprising:
    means for identifying one or more attributes for each of a plurality of positioning resources available at said mobile device, wherein each of said plurality of positioning resources provides a position fix of the mobile device based, at least in part, on at least one of: one or more wireless signals received by said mobile device, or one or more signal received from one or more sensors onboard said mobile device, and wherein at least one of said plurality of positioning resources has at least one of said one or more attributes that is different than at least one other of said plurality of positioning resources;
    means for obtaining a request for a position fix of said mobile device; and
    means for selecting at least one of said positioning resources for obtaining said position fix based, at least in part, on said request and said one or more attributes,
    wherein at least one of said one or more attributes corresponds to at least one position fix criteria that characterizes an expected power consumption,
    wherein at least one of said one or more attributes further corresponds to at least one position fix criteria comprising a combination of an expected achievable time to fix, an expected achievable position accuracy, an expected position availability or an expected position format, and
    wherein at least one of said one or more attributes further corresponds to at least one position fix criteria comprising a combination of a use policy, a security policy or a preference policy.

20. The apparatus as recited in claim 19, wherein said request for said position fix identifies one or more desired characteristics for said position fix, and wherein said means for selecting said at least one of said positioning resources further comprises:
    means for comparing said one or more desired characteristics to at least one of said one or more attributes.

21. The apparatus as recited in claim 20, wherein said one or more desired characteristics for said position fix comprises a desired position accuracy; a desired time to fix or a desired position format; or a combination of said desired position accuracy, said desired time to fix or said desired position format.

22. The apparatus as recited in claim 20, wherein said one or more desired characteristics for said position fix further characterizes a requesting function with regard to a use policy; said security policy or said preference policy; or a combination of a use policy, said security policy or said preference policy.

23. The apparatus as recited in claim 19, wherein said means selecting said at least one of said positioning resources further comprises means for determining whether a recent position fix satisfies said request for said position fix; and further comprising
    means for identifying said recent position fix as said position fix in response to said request for said position fix, in response to a determination that said recent position fix satisfies said request for said position fix.

24. The apparatus as recited in claim 19, wherein at least one of said plurality of positioning resources comprises a satellite positioning system (SPS) based positioning resource; an Advanced Forward Link Trilateration (AFLT) based positioning resource; a cell sector based positioning resource; a wireless network based positioning resource; a near-field communication based positioning resource or an ad hoc network based positioning resource; or a combination of a SPS based positioning resource, an AFLT based positioning resource, said cell sector based positioning resource, said wireless network based positioning resource, said near-field communication based positioning resource or an ad hoc network based positioning resource.

25. The apparatus as recited in claim 19, and further comprising: means for selecting said position fix from a plurality of obtained position fixes.

26. The apparatus as recited in claim 19, wherein said request for said position fix of said mobile device is based, at least in part, on a combination of two or more requests obtained from two or more applications or functions.

27. A mobile device which comprises:
    one or more receivers;
    one or more sensors; and
    one or more processing units to:
        identify one or more attributes for each of a plurality of positioning resources available at said mobile device, wherein each of said plurality of positioning resources provides a position fix of the mobile device based, at least in part, on one or more wireless signals received via said one or more receivers or said one or more electrical signals received from said one or more sensors, or a combination of one or more wireless signals received via said one or more receivers or said one or more electrical signals received from said one or more sensors, and wherein at least one of said plurality of positioning resources has at least one of said one or more attributes that is different than at least one other of said plurality of positioning resources;
        obtain a request for said position fix of said mobile device; and
        select at least one of said positioning resources for obtaining said position fix based, at least in part, on said request and said one or more attributes,
    wherein at least one of said one or more attributes corresponds to at least one position fix criteria that characterizes an expected power consumption,
    wherein at least one of said one or more attributes further corresponds to at least one position fix criteria comprising a combination of an expected achievable time to fix, an expected achievable position accuracy, an expected position availability or an expected position format, and
    wherein at least one of said one or more attributes further corresponds to at least one position fix criteria comprising a combination of a use policy, a security policy or a preference policy.

28. The mobile device as recited in claim 27, wherein said request for said position fix identifies one or more desired characteristics for said position fix, and said one or more processing units to further:
    compare said one or more desired characteristics to at least one of said one or more attributes.

29. The mobile device as recited in claim 28, wherein said one or more desired characteristics for said position fix comprises a desired position accuracy; a desired time to fix; a desired position format; a use policy; said security policy or said preference policy; or a combination of said desired position accuracy, said desired time to fix, said desired position format, a use policy; said security policy or said preference policy.

30. The mobile device as recited in claim 27, said one or more processing units to further:
determine whether a recent position fix satisfies said request for said position fix.

31. The mobile device as recited in claim 30, wherein said request for said position fix is satisfied, at least in part, based on an age of said recent position fix; an accuracy of said recent position fix; a format of said recent position fix; a use policy; a security policy or a preference policy; or a combination of said age of said recent position fix, said accuracy of said recent position fix, said format of said recent position fix, a use policy said security policy or said preference policy.

32. The mobile device as recited in claim 30, said one or more processing units to further:
in response to a determination that said recent position fix satisfies said request for said position fix, identify said recent position fix as said position fix in response to said request for said position fix.

33. The mobile device as recited in claim 27, wherein said one or more receivers are operatively supportive of and at least one of said plurality of positioning resources comprises a satellite positioning system (SPS) based positioning resource; an Advanced Forward Link Trilateration (AFLT) based positioning resource; a cell sector based positioning resource; a wireless network based positioning resource; a near-field communication based positioning resource or an ad hoc network based positioning resource; or a combination of an SPS based positioning resource, an AFLT based positioning resource, said cell sector based positioning resource, said wireless network based positioning resource, said near-field communication based positioning resource or an ad hoc network based positioning resource.

34. The mobile device as recited in claim 27, said one or more processing units to further:
select said position fix from a plurality of obtained position fixes.

35. The mobile device as recited in claim 27, wherein said request for said position fix of said mobile device is based, at least in part, on a combination of two or more requests obtained from two or more applications or functions.

36. The mobile device as recited in claim 27, wherein said request for said position fix of said mobile device is obtained from at least one other processing unit.

37. The mobile device as recited in claim 27, wherein said request for said position fix of said mobile device is obtained by said one or more processing units from an application or a function using a first manager capability provided, at least in part, by said one or more processing units.

38. The mobile device as recited in claim 31, wherein a second manager capability provided, at least in part, by said one or more processing units is responsive to said first manager capability, at least in part, in selecting said at least one of said positioning resources for obtaining said position fix.

39. The mobile device as recited in claim 38, wherein a third manager capability provided, at least in part, by said one or more processing units is responsive to said second manager capability, at least in part, in providing at least one command to said at least one of said positioning resources for obtaining said position fix.

40. An article for use in a mobile device, the article comprising:
a non-transitory computer readable medium having stored therein computer implementable instructions that are executable by one or more processing units to:
identify one or more attributes for each of a plurality of positioning resources available at said mobile device, wherein each of said plurality of positioning resources provides a position fix of the mobile device based, at least in part, on one or more wireless signals received by said mobile device or said one or more signal received from said one or more sensors onboard said mobile device, or a combination of one or more wireless signals received by said mobile device or said one or more signal received from said one or more sensors onboard said mobile device, and wherein at least one of said plurality of positioning resources has at least one of said one or more attributes that is different than at least one other of said plurality of positioning resources;
obtain a request for said position fix of said mobile device; and
select at least one of said positioning resources for obtaining said position fix based, at least in part, on said request and said one or more attributes,
wherein at least one of said one or more attributes corresponds to at least one position fix criteria that characterizes an expected power consumption,
wherein at least one of said one or more attributes further corresponds to at least one position fix criteria comprising a combination of an expected achievable time to fix, an expected achievable position accuracy, an expected position availability or an expected position format, and
wherein at least one of said one or more attributes further corresponds to at least one position fix criteria comprising a combination of a use policy, a security policy or a preference policy.

41. The article as recited in claim 40, wherein said request for said position fix identifies one or more desired characteristics for said position fix, and said computer implementable instructions being further executable to:
select said at least one of said positioning resources for obtaining said position fix further comprises comparing said one or more desired characteristics to at least one of said one or more attributes.

42. The article as recited in claim 41, wherein said one or more desired characteristics for said position fix comprises a desired position accuracy; a desired time to fix; a desired position format; a use policy; said security policy or said preference policy; or a combination of said desired position accuracy; said desired time to fix, said desired position format, a use policy; said security policy or said preference policy.

43. The article as recited in claim 40, said computer implementable instructions being further executable to:
determine whether a recent position fix satisfies said request for said position fix; and
in response to a determination that said recent position fix satisfies said request for said position fix, identify said recent position fix as said position fix in response to said request for said position fix.

44. The article as recited in claim 40, wherein at least one of said plurality of positioning resources comprises a satellite positioning system (SPS) based positioning resource; an Advanced Forward Link Trilateration (AFLT) based positioning resource; a cell sector based positioning resource; a wireless network based positioning resource; a near-field communication based positioning resource or an ad hoc network based positioning resource; or a combination of an SPS based positioning resource, an AFLT based positioning resource, said cell sector based positioning resource, said wireless network based positioning resource, said near-field communication based positioning resource or an ad hoc network based positioning resource.

45. The article as recited in claim 40, said computer implementable instructions being further executable to:
  select said position fix from a plurality of obtained position fixes.

46. The article as recited in claim 40, wherein said request for said position fix of said mobile device is based, at least in part, on a combination of two or more requests obtained from two or more applications or functions.

* * * * *